(12) United States Patent
Fok et al.

(10) Patent No.: US 7,283,816 B2
(45) Date of Patent: Oct. 16, 2007

(54) APPARATUS AND PROCESS FOR A UNIVERSAL DIAGNOSTIC MONITOR MODULE ON A WIRELESS DEVICE

(75) Inventors: Kenny Fok, San Diego, CA (US); Tia Manning Cassett, San Diego, CA (US); Mikhail A. Lushin (Misha), San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/175,606

(22) Filed: Jul. 5, 2005

(65) Prior Publication Data

US 2006/0234698 A1    Oct. 19, 2006

Related U.S. Application Data

(60) Provisional application No. 60/671,565, filed on Apr. 14, 2005.

(51) Int. Cl.
*H04Q 7/20* (2006.01)

(52) U.S. Cl. .................... 455/423; 455/9; 455/97.11; 455/67.13; 455/67.14; 455/418; 455/419; 455/424; 455/425

(58) Field of Classification Search .............. 455/9, 455/67.11, 67.13, 67.4, 418, 419, 423, 424, 455/425
See application file for complete search history.

(56) References Cited

U.S. PATENT DOCUMENTS

| | | | |
|---|---|---|---|
| 5,451,839 A * | 9/1995 | Rappaport et al. .......... 375/224 |
| 5,469,494 A * | 11/1995 | Ortiz Perez et al. ..... 379/27.01 |
| 5,694,451 A * | 12/1997 | Arinell ..................... 379/32.04 |
| 6,567,381 B1 * | 5/2003 | Jeon et al. .................. 370/252 |
| 6,680,914 B1 * | 1/2004 | Jung et al. .................. 370/252 |
| 6,745,011 B1 * | 6/2004 | Hendrickson et al. ... 455/67.11 |
| 6,782,256 B2 * | 8/2004 | Engholm et al. ........... 455/423 |
| 6,801,756 B1 * | 10/2004 | Agrawal et al. ......... 455/67.11 |
| 2002/0081977 A1 * | 6/2002 | McCune, Jr. .............. 455/67.1 |
| 2004/0087303 A1 | 5/2004 | Pugliese |
| 2005/0059354 A1 * | 3/2005 | Zhao et al. .............. 455/67.11 |

FOREIGN PATENT DOCUMENTS

| | | |
|---|---|---|
| EP | 1309214A A | 5/2003 |
| EP | 1441491A A | 7/2004 |
| WO | 0219625 A2 | 3/2002 |
| WO | 2004004381 A | 1/2004 |

* cited by examiner

*Primary Examiner*—Steve M. D'Agosta
(74) *Attorney, Agent, or Firm*—Abdollah Katbab; Alin Corie; Thomas R. Rouse

(57) ABSTRACT

A wireless device includes a communications processing engine having a plurality of diagnostic data relating to the operation of the wireless device on a wireless network; a computer platform having a universal diagnostic monitor module operable to retrieve selected ones of the plurality of diagnostic data from the communications processing engine, and operable to control generation of a view of the selected ones of the plurality of diagnostic data; and a user interface operable to present the view to a user.

44 Claims, 9 Drawing Sheets

APPARATUS AND PROCESS FOR A UNIVERSAL DIAGNOSTIC MONITOR MODULE ON A WIRELESS DEVICE

CLAIM OF PRIORITY UNDER 35 U.S.C. §119

The present Application for Patent claims priority to Provisional Application Ser. No. 60/671,565 entitled "Methods and Systems for Providing Universal Debug Display Applets" filed Apr. 14, 2005, and assigned to the assignee hereof and hereby expressly incorporated by reference herein.

BACKGROUND

The described embodiments relate to wireless devices, and more particularly, to apparatus and methods for retrieving and/or monitoring performance of such wireless devices on at least one wireless communication network.

Wireless communications devices, such as mobile phones, pagers, handheld computers, etc., are becoming increasingly popular for both business and personal use. One advantage of such devices is their "wireless" aspect, allowing them to be utilized whenever and wherever a user desires. As the use of wireless devices grow, and as the associated wireless communications networks grow, users have an ever-increasing expectation of being able to connect with a wireless network at any time and/or any location. However, the performance of a wireless device, e.g., its ability to establish and maintain a communications connection with a wireless network, under certain circumstances, e.g., within a specific area and/or at a specific time, may become unacceptable and needs monitoring and/or testing for troubleshooting purposes.

Typically, wireless devices communicate data, in the form of packets, across a wireless or partially wireless network and open a "data" or "communication" channel on the network such that the devices can send and receive data packets. The wireless devices often have wireless device resources, such as programs and hardware components, which individually use open communication connections to transmit and receive data on the network. Certain data packets, generally referred to as diagnostic data, such as event data and logging data, are stored in the subsystems of the wireless devices, e.g., at the chipset level, and can provide an insight into how well or bad the wireless devices perform. However, retrieval of such data packets has been problematic.

Thus there is a need for an on-phone diagnostic monitor so that the testers can monitor the performance of the cellular telephones or other types of wireless devices anytime and anywhere. Such on-phone diagnostic monitors are desirable by wireless service carriers as well as OEMs (Original Equipment Manufacturer).

SUMMARY

To address one or more of the drawbacks of the prior art, the disclosed embodiments provide a universal diagnostic monitor module, and a wireless device, a user manager and processes using the universal diagnostic monitor module.

In one embodiment, a wireless device comprises a communications processing engine having a plurality of diagnostic data relating to the operation of the wireless device on a wireless network; a computer platform having a universal diagnostic monitor module operable to retrieve selected ones of the plurality of diagnostic data from said communications processing engine, and operable to control generation of a view of the selected ones of the plurality of diagnostic data; and a user interface operable to present said view to a user.

In another embodiment, a wireless device comprises a user interface; a communications processing engine having a plurality of diagnostic data relating to the operation of the wireless device on a wireless network; and a computer platform having a universal diagnostic monitor module operable to retrieve selected ones of the plurality of diagnostic data from said communications processing engine; wherein said universal diagnostic monitor module comprises a user interface configurator executable by the computer platform to present, via said user interface, a menu to a user, said user interface configurator being operable to control the retrieval of the selected ones of the plurality of diagnostic data based on the user's inputs via his or her interaction with said menu.

In a further embodiment, a user manager in a wireless network connecting a plurality of wireless devices each comprising a communications processing engine having a plurality of diagnostic data relating to the operation of the wireless device on the wireless network, said user manager comprises a communication module operable to connect said user manager with at least one of the wireless devices on the wireless network; a user interface; and a server side monitor module operable to retrieve selected ones of the plurality of diagnostic data from the communications processing engine of said at least one wireless device; wherein said server side monitor module comprises a user interface configurator operable to present, via said user interface, a menu to an operator at said server, said user interface configurator being further operable to control the retrieval of the selected ones of the plurality of diagnostic data based on the operator's inputs via his or her interaction with said menu.

In yet another embodiment, a process of monitoring the operation of a wireless device on a wireless network, said process comprises receiving, from a user, inputs regarding at least one operational aspect of the wireless device; based on the user's inputs, retrieving selected ones of a plurality of diagnostic data which relate to the operation of the wireless device on the wireless network and are available from a communications processing engine of the wireless device; and generating and presenting a view of the selected ones of the plurality of diagnostic data to the user.

In a still another embodiment, a computer program is resident in a computer readable medium and comprises computer executable instructions that, when executed, direct a wireless device to perform the steps of receiving, from a user, inputs regarding at least one operational aspect of the wireless device; based on the user's inputs, retrieving selected ones of a plurality of diagnostic data which relate to the operation of the wireless device on a wireless network and are available from a communications processing engine of the wireless device; and generating and presenting a view of the selected ones of the plurality of diagnostic data to the user.

In a yet further embodiment, a wireless communications device comprises: means for receiving, from a user, inputs regarding at least one operational aspect of the wireless device; means for retrieving, based on the user's inputs, selected ones of a plurality of diagnostic data which relate to the operation of the wireless device on a wireless network and are available from a communications processing engine of the wireless device; and means for generating and presenting a view of the selected ones of the plurality of diagnostic data to the user.

In a still further embodiment, a computer program is resident in a computer readable medium and comprises computer executable instructions that, when executed, directs a wireless device to perform the steps of receiving at least one input regarding at least one operational aspect of the wireless device; based on the input, retrieving selected ones of a plurality of diagnostic data which relate to the operation of the wireless device on a wireless network and are available from a communications processing engine of the wireless device; and transmitting the selected ones of the plurality of diagnostic data via the wireless network to a user manager.

In another embodiment, a wireless communications device comprises means for receiving at least one input regarding at least one operational aspect of the wireless device; means for retrieving, based on the input, selected ones of a plurality of diagnostic data which relate to the operation of the wireless device on a wireless network and are available from a communications processing engine of the wireless device; and means for transmitting the selected ones of the plurality of diagnostic data via the wireless network to a user manager.

In yet another embodiment, a computer program is resident in a computer readable medium and comprises computer executable instructions that, when executed, direct a user manager server for a wireless network to perform the steps of: connecting the user manager server with at least one among a plurality of wireless devices operating on the wireless network; receiving, from a user, inputs regarding at least one operational aspect of the wireless device; based on the user's inputs, retrieving selected ones of a plurality of diagnostic data which relate to the operation of the wireless device on the wireless network and are available from a communications processing engine of the wireless device; and generating and presenting a view of the selected ones of the plurality of diagnostic data to the user.

In still another embodiment, a user manager server for a wireless network comprises means for connecting the user manager server with at least one among a plurality of wireless devices operating on the wireless network; means for receiving, from a user, inputs regarding at least one operational aspect of the wireless device; means for retrieving, based on the user's inputs, selected ones of a plurality of diagnostic data which relate to the operation of the wireless device on the wireless network and are available from a communications processing engine of the wireless device; and means for generating and presenting a view of the selected ones of the plurality of diagnostic data to the user.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The described embodiments are illustrated by way of example, and not by limitation, in the figures of the accompanying drawings, wherein elements having the same reference numeral designations represent like elements throughout, and wherein.

DETAILED DESCRIPTION

Figure 1:
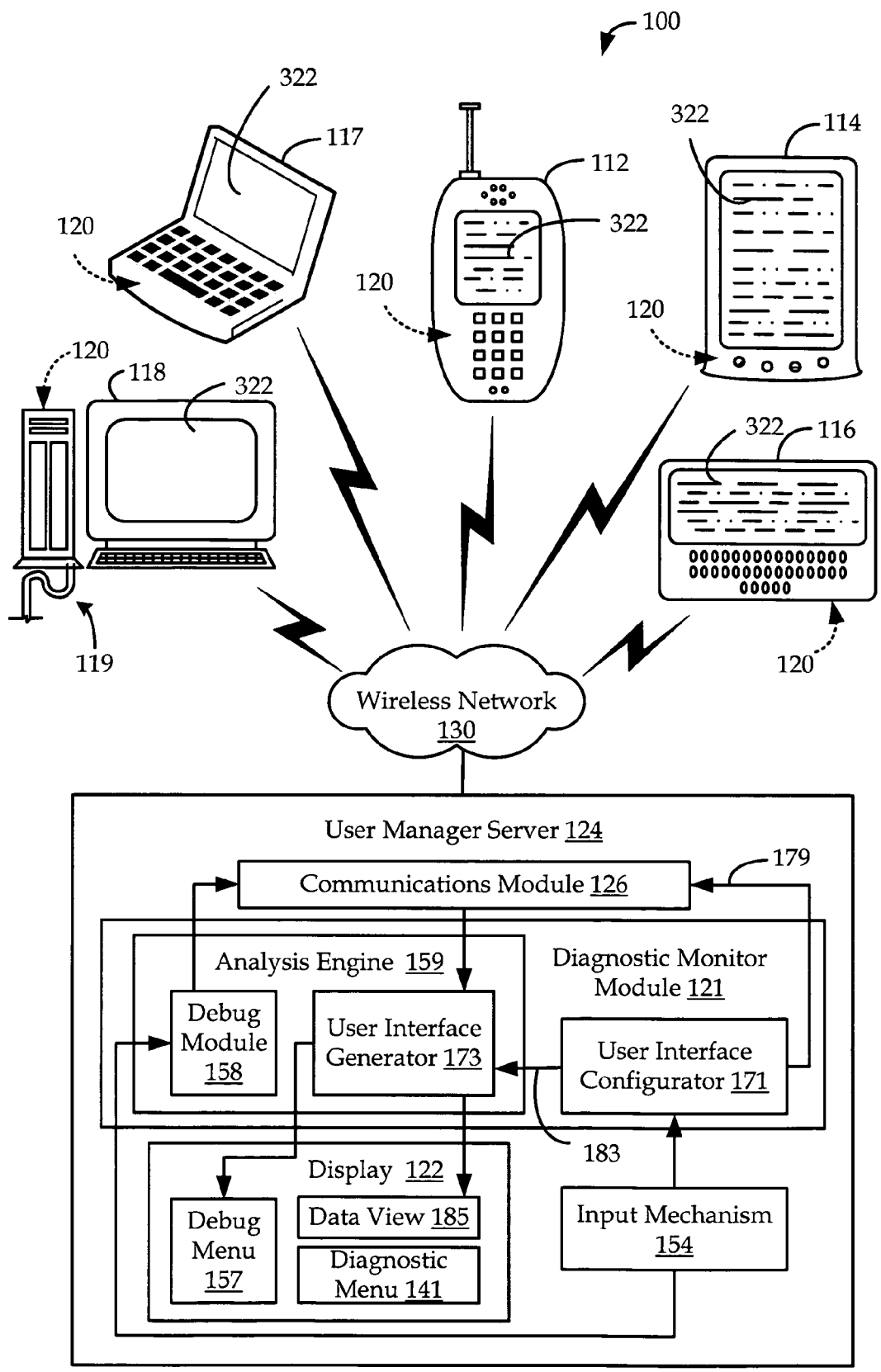
FIG. 1 is a schematic view of a wireless communication system in which one or more universal diagnostic monitor modules in accordance with the described embodiments can be used.

A universal diagnostic monitor module, and a wireless device, a user manager and processes using the universal diagnostic monitor module are described below. In the following detailed description, for purposes of explanation, numerous specific details are set forth in order to provide a thorough understanding of the embodiments. It will be apparent, however, that the embodiments may be practiced without these specific details. In other instances, well-known structures and devices are schematically shown in order to simplify the drawing.

FIG. 1 is a schematic view of a wireless communication system 100 in which one or more universal diagnostic monitor modules in accordance with the described embodiments can be used.

System 100 includes a plurality of wireless devices 112, 114, 116, 117, 118 which communicate with each other and/or other computer devices via a wireless network 130. Any one of wireless devices 112, 114, 116, 117, 118 may have a universal diagnostic monitor module 120 that generates a view of predetermined diagnostic data via a user interface, such as user interface 322 in FIG. 3, as will be described in more detail herein below.

System 100 in the embodiment of FIG. 1 further includes a user manager or server 124 which may communicate with each of wireless devices 112, 114, 116, 117, 118 and/or other computer devices via wireless network 130. Also, user manager 124 may include a server side universal diagnostic monitor module 121 that enables user manager 124 to remotely retrieve predetermined diagnostic data and generate a view of the diagnostic data on user interface 122. The view of the diagnostic data produced by server-side universal diagnostic monitor user interface 121 may be different from or identical to the view produced by universal diagnostic monitor modules 120 of wireless devices 112, 114, 116, 117, 118. User manager 124 may be at least one of any type of server, personal computer, mini-mainframes and the like. In an alternative embodiment, user manager 124 may be omitted, as universal diagnostic monitor modules 120 of wireless devices 112, 114, 116, 117, 118 are independently operable.

Wireless network 130 may include at least one, or any combination, of: a cellular telephone network; a terrestrial telephone network; a satellite telephone network; an infrared network such as an Infrared Data Association (IrDA)-based network; a short-range wireless network; a Bluetooth® technology network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, a ZigBee protocol network, a UWB (Ultra Wide Band) network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: Personal Communications Services, code division multiple access (CDMA), wideband code division multiple access (WCDMA), universal mobile telecommunications system (UMTS), advanced mobile phone service (AMPS), time division multiple access (TDMA), frequency division multiple access (FDMA), global system for mobile communications (GSM), analog and digital satellite systems, and any other technologies/protocols that may be used in at least one of a wireless communications network and a data communications network.

Wireless devices 112, 114, 116, 117, 118 can include any mobile or portable communications device, such as cellular telephone 112, personal digital assistant 114, two-way text pager 116, a laptop computer 117, a tablet computer (not shown), and even a separate computer platform 118 which has a wireless communication portal (not shown), and which also may have a wired connection 119 to a network (not shown) or the Internet (not shown). Additionally, each of wireless devices 112, 114, 116, 117, 118 can be a remote-slave, or other device that does not have an end-user thereof but simply communicates data across wireless network 130. For example, the wireless device may include a remote sensor, a diagnostic tool, a data relay, and the like. The described embodiments can accordingly be applied to any form of wireless communications device or module, including a wireless communication portal, a wireless modem, PCMCIA cards, access terminals, personal computers, telephones, or any combination or sub-combination thereof.

Figure 2:
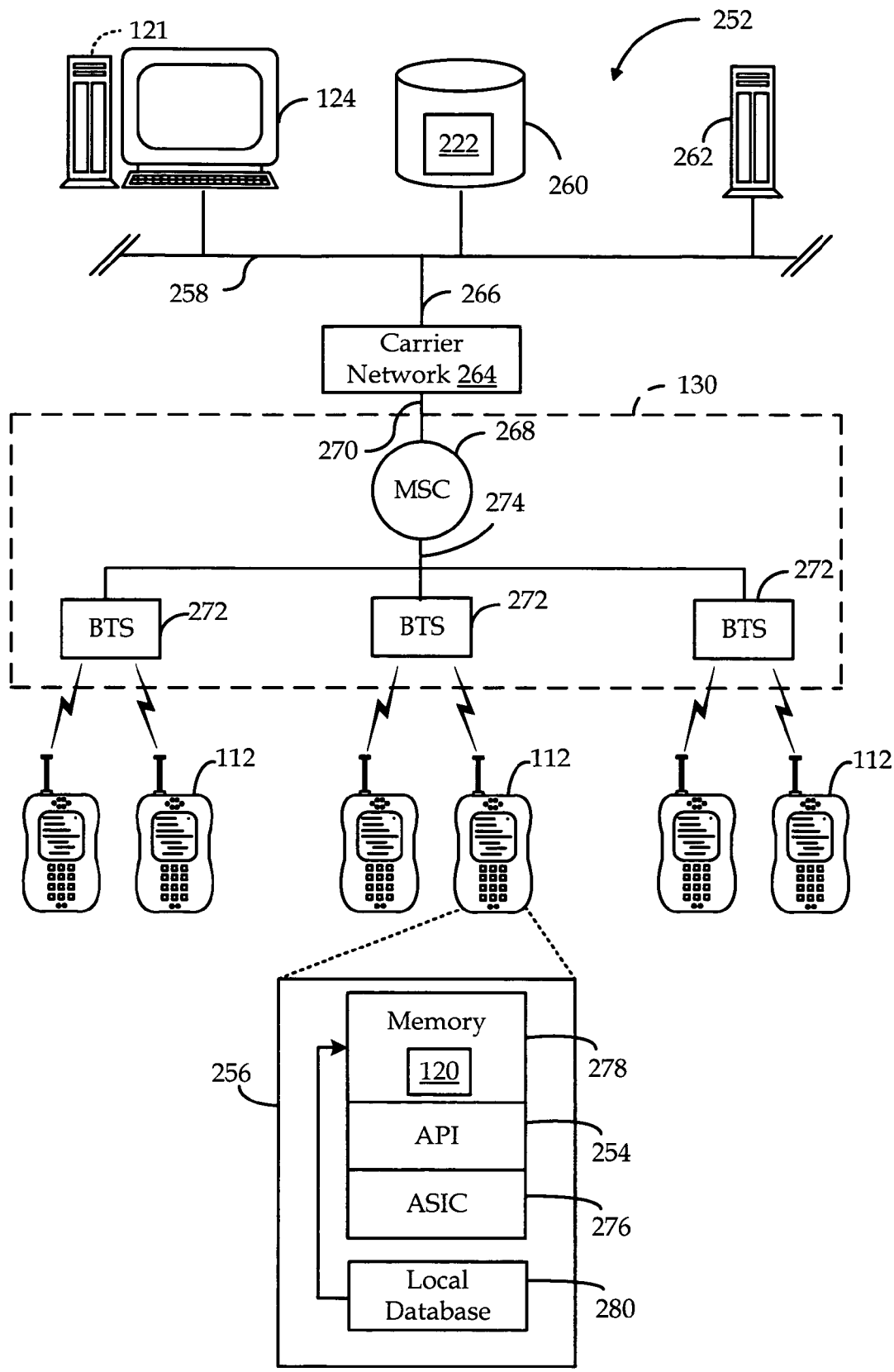
FIG. 2 is a representative diagram showing one embodiment of a cellular telephone network.

FIG. 2 is a representative diagram showing one embodiment of a cellular telephone system 252.

In the cellular telephone embodiment of FIG. 2, wireless network 130 (FIG. 1) may be connected to a local area network (LAN) 258 via a carrier network 264. The use of cellular telecommunication pathways has been increasing because wireless devices, such as the plurality of cellular telephones 112 illustrated in FIG. 2, are being manufactured with increased computing capabilities and are becoming tantamount to personal computers and hand-held personal digital assistants ("PDAs"), communicating packets including voice and data over wireless network 130. These "smart" cellular telephones 112 have installed application programming interfaces ("APIs") 254 onto their local computer platforms 256 that allow software developers to create software applications that operate on cellular telephones 112, and control certain functionality on cellular telephones 112.

In FIG. 2, cellular telephone system 252 is merely exemplary and can include any system whereby remote modules, such as wireless devices 112, 114, 116, 117, 118, communicate over-the-air between and among each other and/or between and among components of wireless network 130, including, without limitation, wireless network carriers and/or servers. In cellular telephone system 252, user manager 124 can be in communication over LAN network 258 with a separate data repository 260 for storing the data gathered from remote wireless devices 112, 114, 116, 117, 118, such as the respective diagnostic data 222. Further, a data management server 262 may be in communication with user manager 124 to provide post-processing capabilities, data flow control, etc. User manager 124, data repository 260 and data management server 262 may be present on system 100 (FIG. 1) with any other network components that are needed to provide cellular telecommunication services. User manager 124, and/or data management server 262 communicate with carrier network 264 through a data link 266, such as the Internet, a secure LAN, WAN, or other wired or wireless network. Carrier network 264 controls messages (generally being data packets) sent to a mobile switching center ("MSC") 268. Further, carrier network 264 communicates with MSC 268 by a network 270, such as the Internet, and/or POTS ("plain old telephone service"). Typically, in network 270, a network or Internet portion transfers data, and the POTS portion transfers voice information. MSC 268 may be connected to multiple base stations ("BTS") 272 by another network 274, such as a data network and/or Internet portion for data transfer and a POTS portion for voice information. BTS 272 ultimately broadcasts messages wirelessly to the wireless devices, such as cellular telephones 112, by short messaging service ("SMS"), or other over-the-air methods.

Further, each wireless device, such as the plurality of cellular telephones 112 in this cellular telephone embodiment, has computer platform 256 that can transmit data across wireless network 130, and that can receive and execute software applications and display data transmitted from user manager 124 or another computer device connected to wireless network 130. Computer platform 256 also includes an application-specific integrated circuit ("ASIC") 276, or other chipset, processor, microprocessor, logic circuit, or other data processing device. ASIC 276 or other processor may execute application programming interface ("API") layer 254 that interfaces with any resident programs, such as universal diagnostic monitor module 120, in a memory 278 of computer platform 256 of the wireless device. API 254 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices. Memory 278 may include read-only and/or random-access memory (RAM and ROM), EPROM, EEPROM, flash cards, or any memory common to computer platforms. Computer platform 256 also includes a local database 280 that can hold the software applications, files, or data not actively used in memory 278, such as the software applications or data downloaded from user manager 124. Local database 280 typically includes one or more flash memory cells, but can be any secondary or tertiary storage device, such as magnetic media, EPROM, EEPROM, optical media, tape, or soft or hard disk. Additionally, local database 280 can ultimately hold a local copy of universal diagnostic monitor module 120 or agent, as is further described herein.

Figure 3:
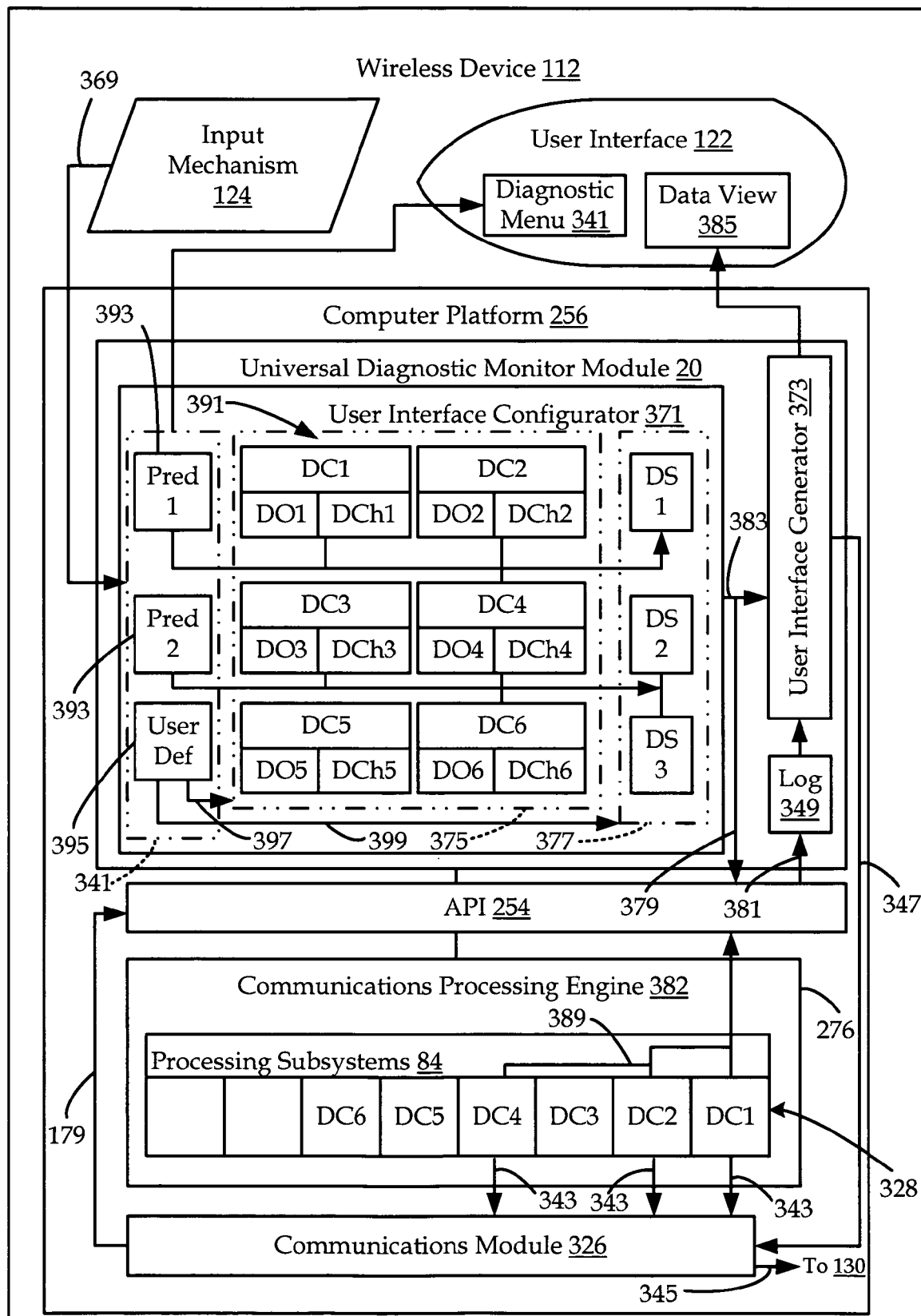
FIG. 3 is a schematic view of one embodiment of a universal diagnostic monitor module resident on a wireless device.

FIG. 3 is a schematic view of one embodiment of a universal diagnostic monitor module resident on a wireless device 112.

In the embodiment of FIG. 3, computer platform 256 includes the resident version of universal diagnostic monitor module 120 that interfaces with API 254 and is executable by a communications processing engine 382, such as a processor associated with a chipset and/or ASIC 276 of the respective wireless device. Communications processing engine 382 includes various processing subsystems 384 embodied in hardware, firmware, software, and combinations thereof, that enable the functionality of the respective wireless device, such as one of wireless devices 112, 114, 116, 117, 118, and the operability of the respective device on wireless network 130, such as for initiating and maintaining communications, and exchanging data, with other networked devices. For example, communications processing engine 382 may include one or a combination of processing subsystems 384, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, and multimedia such as MPEG, GPRS, etc.

In one embodiment, API 254 includes a class of software extensions that allow the resident version of universal diagnostic monitor module 120 to access communications processing engine 382. These software class extensions can communicate with processing subsystems 384 on the wireless device, which allows both data reads and commands. For example, this class can send commands, including retrieval requests for selected ones of a plurality of diagnostic data 328 relating to the operation of the respective wireless device on wireless network 130, on behalf of the applications that invoke it. The class object can then forward the responses of the subsystems 384 either to the resident version of universal diagnostic monitor module 120, via API 254, or ultimately across wireless network 130 to user manager 124, via communications module 326. For example, in the latter case, the selected ones of the plurality of diagnostic data 328 may be made available by one or more of processing subsystems 384 and collected by another subsystem 384, such as a diagnostic subsystem. The resident version of universal diagnostic monitor module 120 executes through API 254 to collect this information and manages the transfer of this information to user manager 124.

"Diagnostic data" in this application is understood as any data packet stored in or otherwise made available by any of subsystems 384. Generally, diagnostic data 328 relates to the operation of the respective wireless devices 112, 114, 116, 117, 118 on wireless network 130. Diagnostic data may include, but are not limited to, events and logs. Events include, but are not limted to, events such as out-of-service events, hand-over events, voice- and/or data-call related events, location system-related events, protocol-related events, media- and/or video player-related events, camera-related events, diagnostic-related events, call manager-related events, application-related events, security/encryption-related events. Logs include, but are not limited to, logs such as serving cell information, temporal analyzer information and cell reselect information.

In the embodiment illustrated in FIG. 3, wireless device 112, in addition to computer platform 256, further includes input mechanism 324 and user interface 322. User interface 322 may include a display capable of displaying at least one of text and graphics. Other examples of user interface 322 include, but are not limited to, voice messages and printed materials. Input mechanism 324 may be selected from one or more of a touch screen, a key pad, navigation keys which can be 4- or 5-way, pointing devices such as mice or track balls etc. In a cellular telephone embodiment, user interface 322 includes the cellular telephone's display and input mechanism 324 includes at least one of the cellular telephone's key pad, navigation keys, and touch screen embedded in the cellular telephone's display. Wireless device 112 further includes communications module 326, also called an air-interface, which may or may not be part of computer platform 256. Communications module 326 is operable to enable wireless device 112 to communicate with wireless network 130 using one or more of the wireless protocols described above. In the cellular telephone embodiment, the most popular wireless protocols include CDMA, GSM/GPRS and UMTS.

The resident version of universal diagnostic monitor module 120 is executable on computer platform 256 of wireless device 112 and may include user interface configurator 371 and user interface generator 373. User interface configurator 371 is operable to receive a user input 369 from input mechanism 324 of wireless device 112. User interface configurator 371 is further operable to, based on user input 369, control the retrieval of selected ones of the plurality of diagnostic data 328 from subsystems 384, by issuing a retrieval request 379 to API 254, which then translates and transmits retrieval request 379 to subsystems 384. The retrieved data 381 may be returned to user interface generator 373, which generates a view 385 of retrieved data 381 and present view 385 on user interface 322. User interface generator 373 may generate view 385 either based solely on retrieved data 381, or on both retrieved data 381 and a user interface configuration setting 383 generated by user interface configurator 371 in response to user input 369. In an embodiment, user interface configuration setting 383 instructs user interface generator 373 how to arrange retrieved data 381 within view 385. User interface configuration setting 383 and retrieval request 379 may be issued separately as shown in FIG. 3 or combined into a single command.

User interface configurator 371 includes a plurality of parameters which are generally divided into two groups, namely, configurable parameters 375 and hidden configuration parameters 377. Configurable parameters 375 include parameters which are customizable by the user, whereas hidden configuration parameters 377 include parameters which have default values that cannot be changed or are intended to be changed only by experienced users, such as software programmers, technicians or customer service representatives. Additionally, some hidden configuration parameters 377 may be parameters having values that are only updated or available on an infrequent or rare basis. Examples of hidden configuration parameters 377 include refresh rates of these rarely available parameter values, and display and/or acquisition of predetermined categories of data.

In one embodiment, configurable parameters 375 include a plurality of data categories, such as DC1, DC2, DC3, DC4, DC5, DC6, one or more data orientations, such as DO1, DO2, DO3, DO4, DO5, DO6, and at least one data characteristic, such as DCh1, DCh2, DCh3, DCh4, DCh5, DCh6.

Data categories DC1-DC6 are categories of data under which the plurality of diagnostic data 328 available in the subsystems 384 of ASIC 276 are grouped. One or more data categories DC1-DC6 is/are selected by user input 369 and included in retrieval request 379 to inform subsystems 384 as to which diagnostic data 328 should be retrieved. Non-limiting examples of data categories DC1-DC6 are provided in and will be described in more detail herein below with respect to FIGS. 5-25.

Data orientations DO1-DO6 are predefined templates, which, when selected or defined by the user, dictates how retrieved data 381 returned from subsystems 384 is arranged within view 385. For this purpose, information corresponding to the selected data orientations may be included in user interface configuration setting 383 issued by user interface configurator 371 to user interface generator 373. Examples of data orientations DO1-DO6 include, but are not limited to, voice, video, tables, maps, graphics, plain text, and relative positions, in time and/or space, of such tables, maps, graphics, plain text within view 385.

Data characteristics DCh1-DCh6 are settings, which, when selected or defined by the user, dictate how the selected ones of the plurality of diagnostic data 328 should be retrieved and/or should be displayed. For this purpose, information corresponding to the selected data characteristics may be included in retrieval request 379 issued by user interface configurator 371 to API 254. In the described embodiments, data characteristics DCh1-DCh6 indicate how often (i.e., every 1 second or 1 minute) or when (i.e., what time of day or day of week) data should be retrieved. For example, some data is not always available, and there may be a data characteristic that allows such data to be continuously displayed until new data becomes available. Further, data characteristics DCh1-DCh6 dictate how certain types of data are displayed. For example, for data that is not available, the given data characteristic for that data category may dictate a display such as "???," "N/A," "_____," or any other character, symbol or graphic that indicates that the data is not available. Further, for example, the data and the time associated with its retrieval or generation may be compared to a predetermined time limit or timer. For data having a time that exceeds the time limit or timer, a.k.a. "stale data" or data having a "stale timer," the data may be displayed in a different form or fashion than "current," "fresh," or non-stale data. For instance, stale data may be displayed in a different color, with a different background, in a different font, or in any other manner that indicates a difference between the stale data and the fresh data. In one embodiment, for example, the only stale data that is displayed is stale data values associated with rarely available or infrequently updated data categories, while data categories where data values are regularly available may instead be represented by "???" or some other character indicating that the data value has expired and is not currently available. Additionally, data characteristics DCh1-DCh6 may further specify events which, if they occur, trigger data retrieval. Examples of the triggering events include, but are not limited to, user's initiation or receipt of a call or data transfer request, decrease of signal strength below a unacceptable level, increase of noise or interference beyond an acceptable level, etc. In another example, the triggering event may be a location, such that when the device enters a predetermined location, then predetermined data, such as data relating to a special roaming list, is collected.

In an embodiment, each of data categories DC1-DC6 is associated by default with one of data orientations DO1-DO6 and one of data characteristics DCh1-DCh6, as shown at 391 in FIG. 3. It should be noted, however, that each data category (DC) may be associated with one or more data orientations (DO) and one or more data characteristics (DCh), depending on the given application. It should be noted that the numbers of available data categories, data orientations, and data characteristics are not necessarily identical. In some of the described embodiments, there are only one or two data orientations and data characteristics for several tens or even hundreds of data categories. Therefore, several data categories may share the same preset data orientation and/or data characteristic.

Additionally or alternatively, each of data categories DC1-DC6 may be further associated by default with one or more other data categories. Therefore, when data belonging to one of data categories DC1-DC6 is selected by the user to be retrieved, the data belonging to the associated data categories is automatically retrieved and presented to the user to provide the user with a full picture of the currently selected aspect of the operation of the wireless device. This feature may be implemented by grouping the associated data categories, data orientations and data characteristics into a plurality of predefined sets 393 as illustrated in FIG. 3. For example, a first predefined set 393 illustrated in FIG. 3 includes data categories DC1, DC2 and DC4. As disclosed above, data categories DC1, DC2 and DC4 may be associated by default with data orientations DO1, DO2 and DO4, respectively and data characteristics DCh1, DCh2 and DCh4, respectively. Thus, first predefined set 393 includes data categories DC1, DC2 and DC4, data orientations DO1, DO2 and DO4, and data characteristics DCh1, DCh2 and DCh4. Likewise, second predefined set 393 include data categories DC3, DC4 and DC6, data orientations DO3, DO4 and DO6, and data characteristics DCh3, DCh4 and DCh6. The predefined sets 393 do not necessarily share common parameters, such as data category DC4 in the first and second predefined sets 393, and can include non-overlapping groups of data categories DC1-DC6.

In one embodiment, each of predefined sets 393 may include not only configurable parameters 375, such as data categories, data orientations and data characteristics, but also one or more hidden configuration parameters 377. For example, in the embodiment of FIG. 3, first predefined set 393 further includes default setting DS1, whereas second predefined set 393 further includes default setting DS2 and DS3. As disclosed above, default setting DS1 as well as other hidden configuration parameters 377, such as default settings DS2 and DS3 illustrated in FIG. 3, cannot be changed or are intended to be changed only by experienced users, such as developers/programmers, technicians or customer service representatives. For example, developers/programmers can add and remove types of data or logs that are being collected. They can perform these operations by modifying source code of the application. On the other hand, technicians and customer service may use user manager 124 to modify settings that are not available for the device user but do not require any code change. One example of such settings is the display of the "stale" data. A technician may choose not to display any data after it becomes stale. Also technicians or customer service may modify any of the user settings remotely, from user manager 124. These default settings will be described herein below in more detail with respect to FIGS. 5-25.

The user's selection one or more of predefined sets 393 is facilitated by proving the user with a menu, such as diagnostic menu 341, via user interface 322. Diagnostic menu 341 may be part of user interface configurator 371 and can be sent by user interface configurator 371 either directly to user interface 322, as shown in FIG. 3, or indirectly through user interface generator 373. Diagnostic menu 341 presents a plurality of menu options (not shown in user interface 322 of FIG. 3) that allow the user to quickly select one of predefined sets 393 by connecting each of the menu options to one of predefined sets 393. Diagnostic menu 341 may further include a User Define menu option (not shown in FIG. 3) which, when selected, allows the user to customize a user-defined set 395 of the parameters of user interface configurator 371. In particular, the selection of the User Define menu option provides the user with an opportunity to browse configurable parameters 375, as schematically shown at 397, and/or hidden configuration parameters 377, as schematically shown at 399, and choose the desired parameters.

Figure 4:
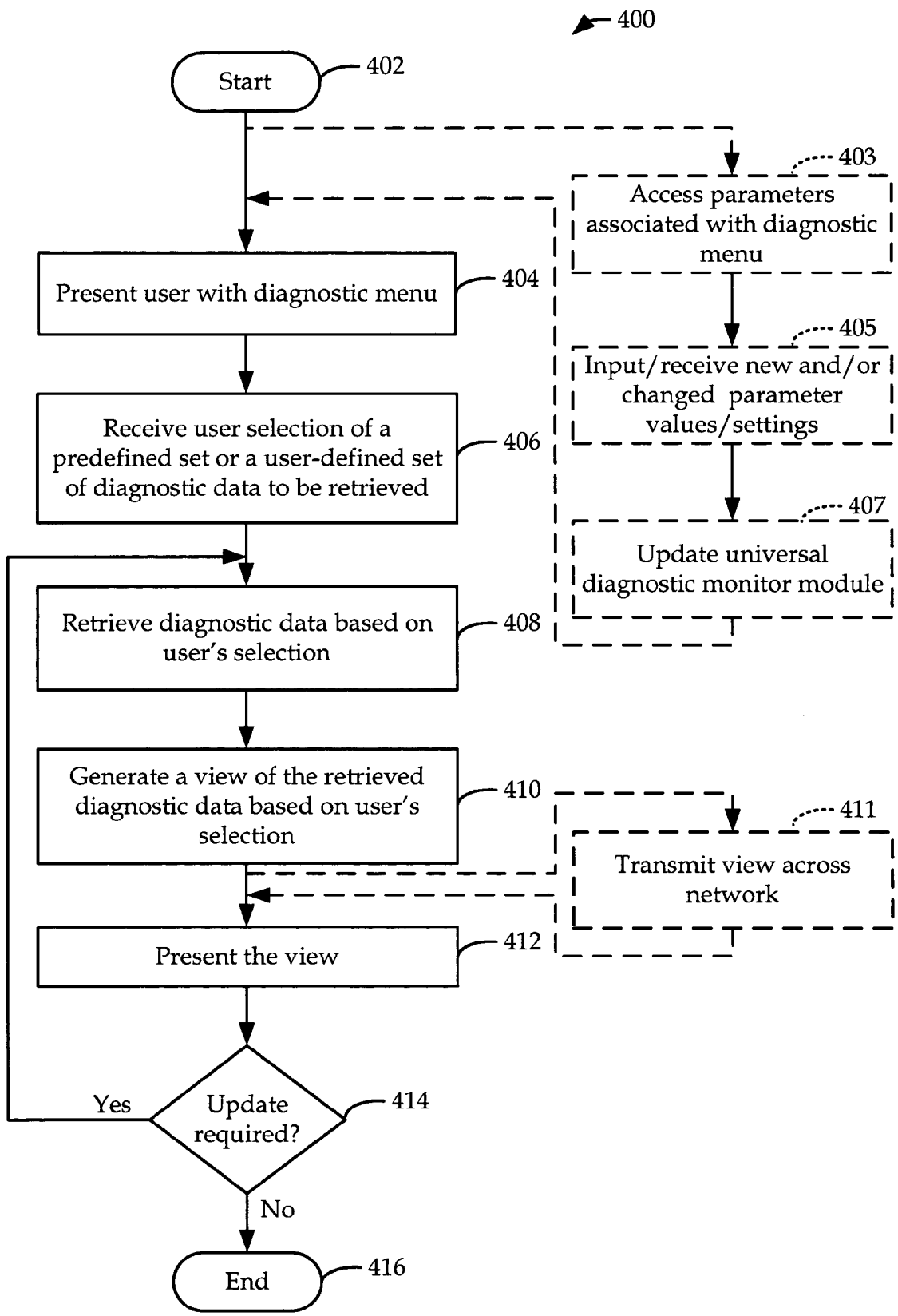
FIG. 4 is a flow chart of a process using the universal diagnostic monitor module.

FIG. 4 is a flow chart of a process 400 using the universal diagnostic monitor module. The process starts at 402 and ends at 416. At 404, a diagnostic menu is presented to a user of a wireless device having universal diagnostic monitor module. In the resident version of universal diagnostic monitor module 120 illustrated in FIG. 3, user interface configurator 371 either directly or via user interface generator 373 sends diagnostic menu 341 to user interface 322 to be presented to the user. In the cellular telephone embodiment, for example, diagnostic menu 341 may be displayed on the cellular telephone's display.

At 406, universal diagnostic monitor module 120 receives a user selection of a menu option of diagnostic menu 341 which can either be linked to one of predefined sets 393 or allow the user to customize a user-defined set 395.

At 408, the process proceeds to retrieve data according to the user's selection. For example, in the resident version of universal diagnostic monitor module 120, if the user selects first predefined set 393, data belonging to data categories DC1, DC2 and DC4 is be chosen for retrieval. User interface configurator 371 issues a retrieval request 379 to API 254, which then translates and transmits retrieval request 379 to subsystems 384 via communications processing engine 382. The subsystems 384, indicated with DC1, DC2 and DC4 in FIG. 3, in which the required data are available, return the retrieved data 389. Retrieved data 389 may be translated by API 254 into retrieved data 381 prior to being supplied by API 254 to user interface generator 373.

At 410, a view of the retrieved data is generated based on the user's selection. For example, in the resident version of universal diagnostic monitor module 120, user interface generator 373 may independently generate a view 385 of retrieved data 381 and present view 385 on user interface 322. User interface generator 373 may also generate view 385 based on both retrieved data 381 and a user interface configuration setting 383 generated by user interface configurator 371. As discussed above, user interface configuration setting 383 includes the associated data orientations DO1, DO2 and DO4 which instruct user interface generator 373 how to arrange retrieved data 381 within view 385.

At 412, the generated view is presented to the user. For example, in the resident version of universal diagnostic monitor module 120, view 385 is presented on the same user interface 322 as diagnostic menu 341. Therefore, the same user can be presented with view 385 of retrieved data 381. Additionally or alternatively, view 385 can be presented to another user, e.g., an administrator. At 411, for example, view is transmitted, as schematically shown at 347 and 345 in FIG. 3, from user interface generator 373 to another node (not shown in FIG. 3) on wireless network 130 via communications module 326. For example, view 385 may be transmitted to user manager 124 and/or any one of the plurality of wireless devices 112, 114, 116, 117, 118 of system 100 shown in FIG. 1. The transfer 347 may be direct or indirect, by being routed through API 254 and/or ASIC 276, depending on the particular configuration of wireless device 112.

At 414, the process determines whether the retrieved data needs to be updated. If yes, the process returns to step 408 where data belonging to the selected data categories is updated, followed by an update of the data view and presentation of the updated view to the same and/or different user. If no, the process ends at 416. For example, in the resident version of universal diagnostic monitor module 120, the information regarding the need for data update may be included in retrieval request 379. In particular, retrieval request 379 may further include the associated data characteristics DCh1, DCh2 and DCh4 which instruct the associated subsystems 384 how the data should be retrieved, e.g., by specifying a refresh rate for each or all of selected data categories DC1, DC2 and DC4. Accordingly, universal diagnostic monitor module 120 executes so as to update the data belonging to the data categories that need to be updated, based on the respective data characteristics DCh1, DCh2 and DCh4. The updated data is returned to user interface generator 373 via the previous path designated at 389 and 381, and view 385 is updated accordingly. Again, the updated view can be additionally or alternatively sent to another user, such as user manager 124 of system 100 shown in FIG. 1.

In one embodiment of an alternative method, at 403, a customer service representative, technician or programmer may access the various parameters associated with the diagnostic module, and, at 405, input new or changed parameter values/settings. For example, a technician or customer service representative may change the settings of hidden configurations depending on a given trouble-shooting scenario. Further, for example, a programmer may build additional functionality into the module, or change the existing functionality. Such access may occur directly at the device on which the diagnostic monitoring module is resident, or the access may occur from a remote location, such as from a user manager located across a network. Additionally, at 407, the diagnostic monitor module is updated with the new or changed settings. At this point, the remaining portions of method 400 may be executed as described above. At 411, in one remote access embodiment, however, method 400 may include transmitting the generated view across the network, for example to the user manager, for remote presentation (at 412) of the view. In this case, the decision as to whether or not an update is required (at 414) may also be made at the remote location, and if so desired, a request to retrieve new data may be sent back to the device across the network. Thus, method 400 may be implemented locally on the wireless device, or remotely from across a network connection.

A cellular telephone embodiment of the resident version of universal diagnostic monitor module 120 will now be described with respect to FIGS. 5-25, which are various views showing examples of a user interface of a cellular telephone using one embodiment of the resident version of universal diagnostic monitor module 120. It should be noted that these figures represent only one example of a set of diagnostic monitoring menus and options. The universal diagnostic monitoring module may take many other forms, depending on the given application. Thus, this example is not to be construed as limiting in any respect.

Figure 5:
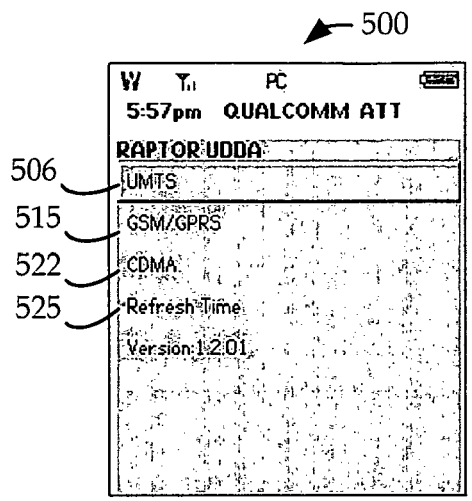
FIGS. 5-25 are various views showing a user interface of a wireless device using the resident version of universal diagnostic monitor module.

FIG. 5 is a view of a main menu 500 including a plurality of menu options 506, 515, 522, and 525. Menu options 506, 515, and 522 allow the user to select a wireless protocol, namely, one of UMTS, GSM/GPRS and CDMA, respectively, with which wireless device 112 currently communicates with wireless network 130. It should be again noted that universal diagnostic monitor module 120 is universal and can operate across multiple communication technologies and multiple wireless protocols. Menu option 525 allows the user to enter, using e.g., a key pad, the desired refresh rate, as can be seen at 2500 in FIG. 25. The refresh rate of 1 second is an example of a default value. Menu option 525 corresponds to user-defined set 395 of FIG. 3 which allows the user to customize one or more parameters. In this particular case, the refresh rate corresponds to one of data characteristics DCh1-DCh6 of FIG. 3. The refresh rate may be common to multiple data categories, as will be described herein after.

In an embodiment, wireless device 112 and/or universal diagnostic monitor module 120 may be configured to automatically sense the current protocol and bring the user directly to the next menu level corresponding to the sensed, current protocol, thereby bypassing or omitting main menu 500. If this is the case, menu option 525 is moved to the next level menus exemplified in FIGS. 6, 15 and 22.

Figure 6:
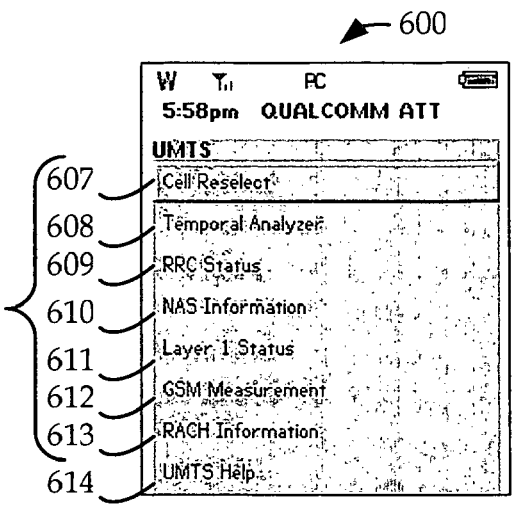

Referring to FIG. 6, the user's selection of menu option 506 (FIG. 5) brings up a lower level menu 600 which, in this case, corresponds to one embodiment of a UMTS protocol diagnostic menu. Menu 600 corresponds to diagnostic menu 341 of FIG. 3, and includes multiple predefined sets 393, namely, menu options 607-613. A Help menu option 614 is also provided in menu 600 to assist the user with the correct selection of one or more of menu options 607-613. Although, menu 600 lacks a menu option corresponding to user-defined set 395 of FIG. 3, the Refresh Time menu option (525 in FIG. 5) can be added to menu 600. It should be again noted that user-defined set 395 may include any one of the data categories, data orientations and data characteristics of user interface configurator 371.

Figure 7:
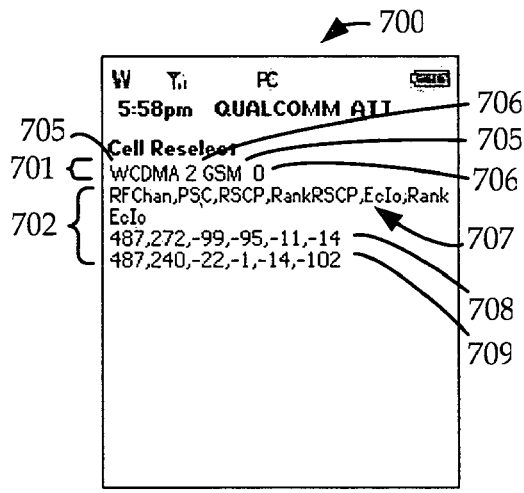

Referring to FIG. 7, the user's selection of menu option 607 (FIG. 6) instructs wireless device 112 to acquire data for one embodiment of a Cell Reselect test. A data view 700, which corresponds to view 385 of FIG. 3, is generated by universal diagnostic monitor module 120 and presented in user interface 322 as illustrated in FIG. 7. In data view 700, selected data categories 705, 707 under which the data is retrieved, are provided, namely, WCDMA, GSM, radio frequency channel (RFChan), primary scrambling code (PSC), received signal code power (RSCP), a ranking of the RSCP of the given cell relative to the serving cell (RankRSCP), the signal noise level in dB (EcIo or $E_c/I_o$), and a ranking of the signal noise level of the given cell relative to the serving cell (RankEcIo). The listed data categories are the selected ones grouped together under menu option 607 which corresponds to one of predefined sets 393 in FIG. 3. Assuming that menu option 607 in FIG. 6 corresponds to first predefined set 393 in FIG. 3, then selected data categories 705, 707 in data view 700 correspond to data categories DC1, DC2 and DC4 associated with first predefined set 393. The retrieved data for each of the data categories are designated at 706, 708, 709.

The data orientations associated with the selected data categories dictate the manner in which user interface generator 373 arranged the retrieved data, i.e., in two different formats 701 and 702, for a first group 705 of data categories including WCDMA and GSM, and a second group 707 of data categories including RFChan, PSC, RSCP, RankRSCP, EcIo, and RankEcIo, respectively. On the one hand, the data categories of first group 705, i.e., WCDMA and GSM, include a first type of data, such as network-related data. The retrieved data 706 of first group 705, i.e., "2" and "0," are presented next to the respective data categories, namely, WCDMA and GSM, as set forth by the data orientations associated with the data categories of first group 705. Specifically, assuming that the data categories of first group 705, i.e., WCDMA and GSM, correspond to data category DC1 in FIG. 3, then data characteristic DCh1 controls the refresh rate of WCDMA and GSM, whereas data orientation DO1 controls format 701 of retrieved data 706 being arranged within data view 700.

On the other hand, the data categories of second group 707, i.e., RFChan, PSC, RSCP, RankRSCP, EcIo, and RankEcIo, include second type of data, such as communication channel-related data. The retrieved data 708, 709 under these data categories are updated as set forth by the data characteristics associated with the data categories of second group 707. The retrieved data 708, 709 of second group 707, i.e., "487," "272," "−99,", "−95,", "−11" and "−14," are presented below and correspond to the respective data categories, namely, RFChan, PSC, RSCP, RankRSCP, EcIo, and RankEcIo, as set forth by the data orientations associated with the data categories of second group 707. In this particular embodiment, the format in which the retrieved data of the second group data categories is presented in data view 700 is a Comma Separated Values format. Other formats such as table, graph, etc., are not excluded. Specifically, assuming that the data categories of second group 707, i.e., RFChan, PSC, RSCP, RankRSCP, EcIo, and RankEcIo, correspond to data category DC2 in FIG. 3, then data characteristic DCh2 controls the refresh rate of RFChan, PSC, RSCP, RankRSCP, EcIo, and RankEcIo, whereas data orientation DO2 controls format 702 of retrieved data 708, 709 being arranged within data view 700.

In this specific example, there are two sets of retrieved data being presented under the data categories of second group 707 in data view 700, namely, 708 and 709. First data set 708 includes data 708 retrieved for a first channel, while second data set 709 includes data 709 retrieved for a second channel. This example represents a snap-shot in time, and the number of channels of data may vary at any given time.

Further, such a view of the diagnostic data may present current data as well as past data. For example, the time interval between current data and the past data is dictated by the refresh time specified by the user selecting menu option 525, or the default refresh rate if the user did not select menu option 525 to enter a desired refresh time. For example, current data may be appended to the end of the previous data, i.e., after the first data set without replacing the first data set. Such a configuration is dictated by the associated data orientations, e.g., DO2 in FIG. 3, and gives the user a sense of how the data has changed over time. Alternatively, an updated data set could overwrite a previous data set. In one embodiment, a previous data set may include very "old" data which is no longer necessary and therefore is replaced with an updated data set. In another embodiment, due to the limited displaying capacity of user interface 322, which may not be capable of handling an excessive number of data sets, previous data sets are discarded in favor of newly updated ones. An alternative solution is to keep all data sets on user interface 322 and allow the user to scroll from screen to screen.

Figure 8:
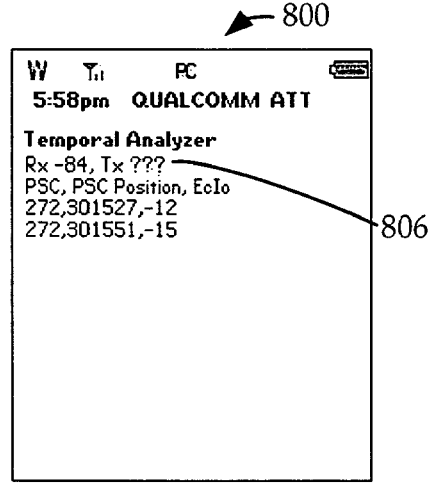

Referring to FIG. 8, from menu 600 of FIG. 6, the user's selection of menu option 608 instructs wireless device 112 to acquire data for one embodiment of a Temporal Analyzer test. A data view 800 is generated by universal diagnostic monitor module 120 and presented in user interface 322 as illustrated in FIG. 8. In data view 800, the selected data categories, under which the data is retrieved, include first type of data categories including receive power (Rx) and transmit power (Tx), for example measured in dBm, and second type of data categories including primary scrambling code (PSC), PSC position, and EcIo. It should be noted that the selected data categories grouped under menu options 607 and 608 share several common data categories, such as PSC and EcIo, in a manner similar to first and second predefined set 393 which share common data category DC4, as shown in FIG. 3. The data retrieved under the selected data categories of menu option 608 are for a plurality of PSC's at one time, and are arranged in data view 800 in a manner similar to data view 700 and will not be described again.

Figure 8A:
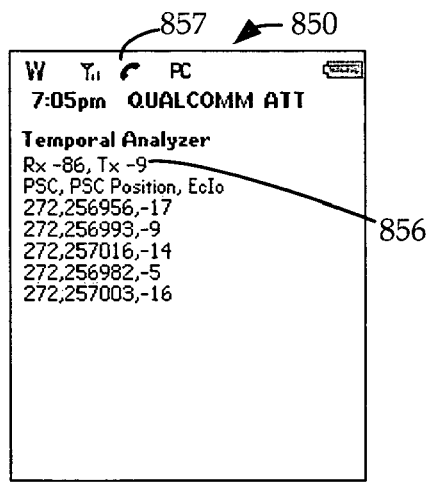

It should further be noted that data under one or more data categories, in this case the transmitted signal power Tx, may be difficult to obtain and/or currently unavailable and is presented in data view 800 by marks 806 that present an unknown value, such as question marks. When the data becomes available, it will be properly presented as shown at 856 in data view 850 of FIG. 8A. Additionally, FIG. 8A represents a diagnostic snap-shot in time that includes data from a greater number PSC's than the snap-shot represented by FIG. 8 because FIG. 8A was taken at a different time and in a different mode. FIG. 8A represents a screenshot taken in a dedicated mode, i.e. when the respective wireless device was in a call, as denoted by the dedicated mode indicator 857, i.e. a phone icon. On the other hand, FIG. 8 represents a screenshot taken in an idle mode, i.e. there is no dedicated mode indicator 857. The data characteristic "when data becomes available" or "whenever new data arrives" is, in this embodiment, associated with data category Tx, although it could apply to any data category. This means universal diagnostic monitor module 120 continuously or periodically, such as based on the refresh rate, monitors the subsystem or subsystems 384 that include(s) the data under data category Tx, and returns the Tx data to user interface generator 373 whenever it becomes available. In an embodiment, when the new data arrives, wireless device 112 plays a sound or vibrates or otherwise notifies the user of the data availability.

Figure 9:
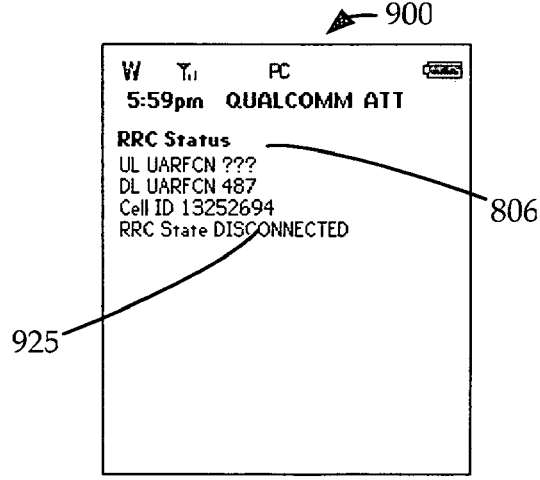

Referring to FIG. 9, from menu 600 of FIG. 6, the user's selection of menu option 609 instructs wireless device 112 to acquire data for one embodiment of a Radio Resource Control (RRC) Status test. A data view 900 is generated by universal diagnostic monitor module 120 and presented in user interface 322 as illustrated in FIG. 9. In data view 900, the selected data categories, under which the data is retrieved, include uplink (UL) universal terrestrial radio access absolute radio frequency channel number (UARFCN), downlink (DL) UARFCN, cell identification (Cell ID) and RRC State. Again, data under one or more data categories, in this case UL UARFCN, is not available and presented in data view 900 by question marks similar to question marks in FIG. 8. The retrieved data are presented next to the respective data categories, similar to format 701 in FIG. 7. Data view 900 demonstrates that the retrieved data may be presented via user interface 322 not only by numerical values, but also by alphabetical characters, as illustrated at 925. Other data formats such as voice, graphic, video, animation are not excluded.

Figure 10:
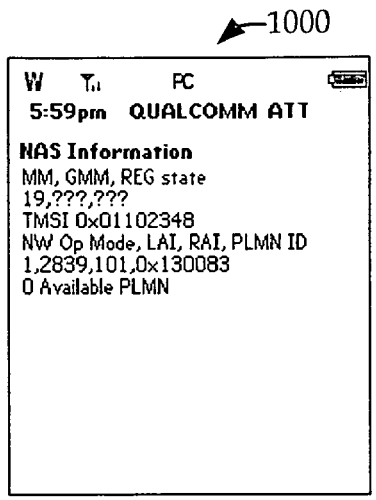
Figure 10A:
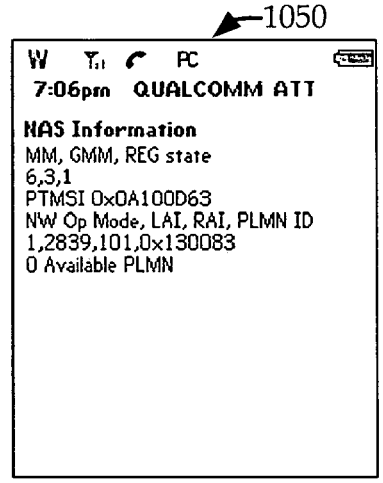

Referring to FIG. 10, from menu 600 of FIG. 6, the user's selection of menu option 610 instructs wireless device 112 to acquire data for one embodiment of a Non-Access Stratum (NAS) Information test. A data view 1000 is generated by universal diagnostic monitor module 120 and presented in user interface 322 as illustrated in FIG. 10. In data view 1000, the selected data categories, under which the data is retrieved, include mobility management (MM), general packet radio service (GPRS) mobility management (GMM), registration (REG) state, temporary mobile subscriber identity (TMSI), network operation mode (NW Op Mode), location area identity (LAI), routing area identity (RAI), public land mobile network identification (PLMN ID), and Available PLMN. The retrieved data are arranged in the manner similar to the previously described data views, except in the last line where the retrieved data, i.e., "0," is arranged before, rather than after the respective data category, i.e., Available PLMN. Data view 1000 demonstrates that the retrieved data and the respective data category can be arranged arbitrarily as long as the connection between the data and the data category is ascertainable to the user. FIG. 10A is an updated view 1050 of data view 1000, wherein the previously unavailable data, e.g., under data categories GMM and REG State, have been successfully obtained and presented via user interface 322. Additionally, in FIG. 10A, the data category TMSI has been replaced with the packet TMSI (PTMSD) data category as FIG. 10A represents a screenshot taken when the services to the wireless device were provided through a Serving GPRS Support Node (SGSN). On the other hand, FIG. 10 represents a screenshot taken when the services to the wireless device were provided through a Visitor Location Registry (VLR).

Figure 11:
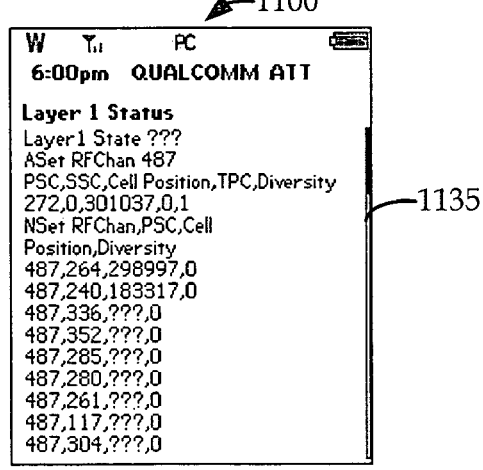

Referring to FIG. 11, from menu 600 of FIG. 6, the user's selection of menu option 611 instructs wireless device 112 to acquire data for one embodiment of a Layer 1 Status test. A data view 1100 is generated by universal diagnostic monitor module 120 and presented in user interface 322 as illustrated in FIG. 11. In data view 1100, the selected data categories, under which the data is retrieved, include Layer1 State, active set radio frequency channel (ASet RF Chan) and its associated data categories: PSC, secondary scrambling code (SSC), Cell Position, transmit power control (TPC), Diversity; and neighbor set radio frequency channel (NSet RF Chan) and its associated data categories: PSC, Cell Position, and Diversity. The retrieved data are arranged in the manner similar to the previously described data views. In this snap-shot, data values corresponding to many different NSet RF Channels are obtained at one time, and vertical scrollbar 1135 may be generated by user interface generator 373 automatically, thereby allowing the user to control which portion of relatively long data view 1100 is currently visible in user interface 322. Additionally or alternatively, a horizontal bar (not shown in FIG. 11) can also be generated for the same purpose.

Figure 12:
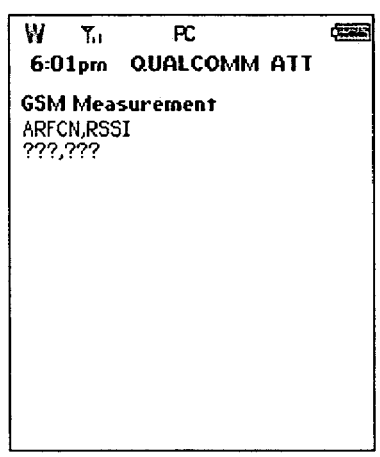

Referring to FIG. 12, from menu 600 of FIG. 6, the user's selection of menu option 612 instructs wireless device 112 to acquire data for one embodiment of a GSM Measurement test. A data view 1200 is generated by universal diagnostic monitor module 120 and presented in user interface 322 as illustrated in FIG. 12. In data view 1200, the selected data categories, under which the data is retrieved, include absolute radio frequency channel number (ARFCN) and received signal strength indicator (RSSI). The retrieved data are arranged in the manner similar to the previously described data views.

Figure 13:
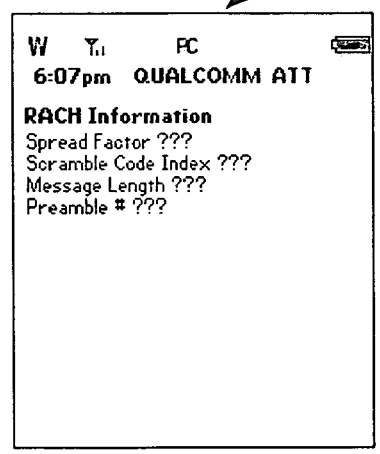
Figure 13A:
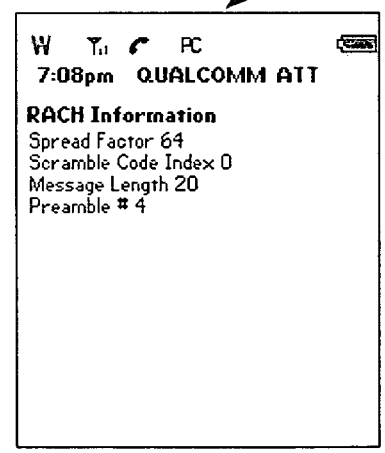

Referring to FIG. 13, from menu 600 of FIG. 6, the user's selection of menu option 613 instructs wireless device 112 to acquire data for one embodiment of a random access channel—transport channel (RACH) Information test. A data view 1300 is generated by universal diagnostic monitor module 120 and presented in user interface 322 as illustrated in FIG. 13. In data view 1300, selected data categories, under which the data is retrieved, include Speed Factor, Scramble Code Index, Message Length, and Preamble #. All required data are not initially available. FIG. 13A is an updated view 1350 of data view 1300, wherein the previously unavailable data have been successfully obtained and presented via user interface 322.

Figure 14:
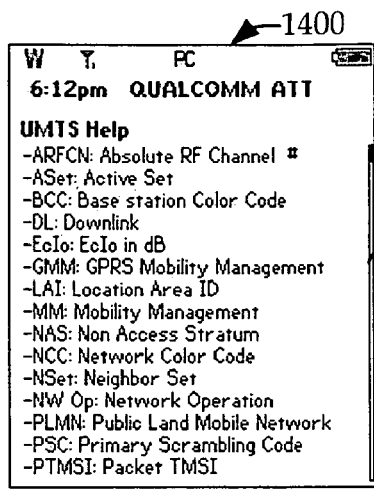

Referring to FIG. 14, from menu 600 of FIG. 6, the user's selection of menu option 614 brings up one embodiment of a UMTS Help view 1400 which, in this particular embodiment, provides information on and/or a brief explanation of the data categories used in the tests of menu options 607-613. UMTS Help view 1400 includes only a portion of the list, and scrollbar 1135 may be utilized to display the remaining portions. Other guidance and/or information are not excluded.

The above list of menu options 607-613 are provided only as an example and may be shortened or expanded depending on the given application. An alternative list of menu options for the UMTS protocol includes one or more of Call Reselect, Temporal Analyzer, RRC Status, NAS Information, Layer 1 Status, GSM Measurement, RACH Information, Block Error Rate, high speed data packet access (HSDPA) Decoding Statistics, message authentication code (MAC) Channel Mapping, MAC Channel Parameters, and Physical channels. It should be noted, however, that additional menu options, predetermined tests, etc. may be included and/or developed to retrieve and display any UMTS diagnostic data, in any manner, that may be of interest to a user.

Figure 15:
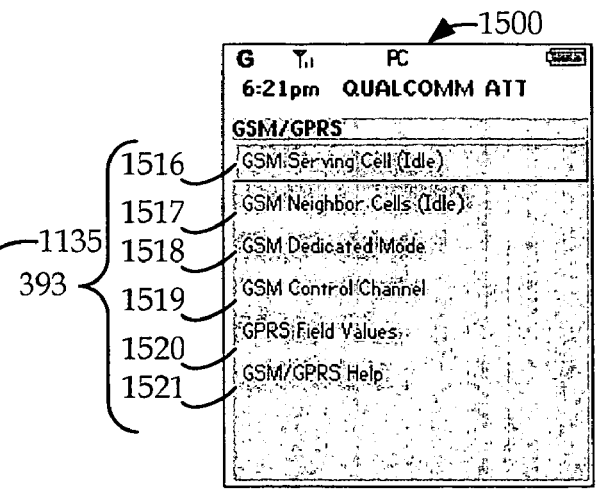

Referring to FIG. 15, the user's selection of menu option 515 (FIG. 5) brings up a lower level menu 1500 which corresponds to the GSM/GPRS protocol/standard diagnostic menu. Menu 1500 corresponds to diagnostic menu 341 of FIG. 3, and includes multiple predefined sets 393, namely, menu options 1516-1520. A Help menu option 1521 is also provided in menu 1500 to assist the user with the correct selection of one or more of menu options 1516-1520. Again, the Refresh Time menu option (525 in FIG. 5) can be added to menu 1500.

Figure 16:
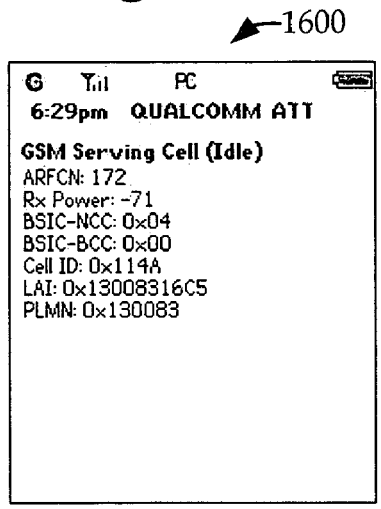

Referring to FIG. 16, from menu 1500 of FIG. 15, the user's selection of menu option 1516 instructs wireless device 112 to acquire data for one embodiment of a GSM Serving Cell (Idle) test. A data view 1600 is generated by universal diagnostic monitor module 120 and presented in user interface 322 as illustrated in FIG. 16. In data view 1600, the selected data categories, under which the data is retrieved, include ARFCN, Rx Power, base station identity code (BSIC)-network color code (NCC), BSIC-base station color code (BCC), Cell ID, LAI, and PLMN. The retrieved data are arranged in the manner similar to the previously described data views.

Figure 17:
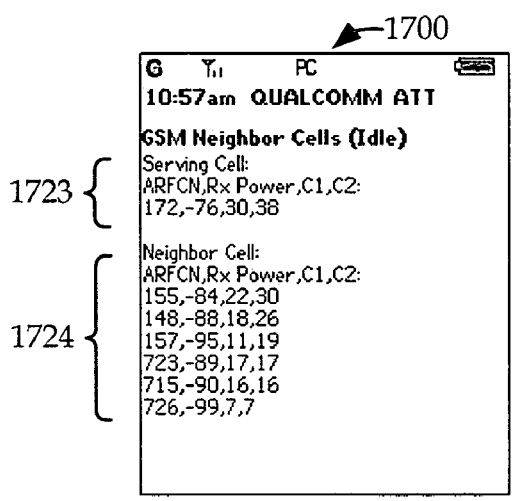

Referring to FIG. 17, from menu 1500 of FIG. 15, the user's selection of menu option 1517 instructs wireless device 112 to acquire data for the GSM Neighbor Cells (Idle) test. A data view 1700 is generated by universal diagnostic monitor module 120 and presented in user interface 322 as illustrated in FIG. 17. In data view 1700, the selected data categories, under which the data is retrieved, include, for both Serving Cell and Neighbor Cell, ARFCN, Rx Power, a computed C1 value for a cell (C1), and a computed C2 value for a cell (C2). C1 is a cell selection algorithm (in this case C1 is the computed value of that algorithm). This algorithm uses the power received from cells with some additional parameters to determine the cell that would provide the best radio connection to the wireless device. C2 is a GSM cell reselection algorithm (in this case C2 is the computed value of that algorithm). Once the wireless device has chosen the cell, it continues monitoring other cells. When current cell becomes unsuitable, the reselection happens. The retrieved data are arranged in the manner similar to the previously described data views, except that multiple sets 1723, 1724 of data for the Serving Cell and one or more Neighbor Cells, respectively, are provided.

Figure 18:
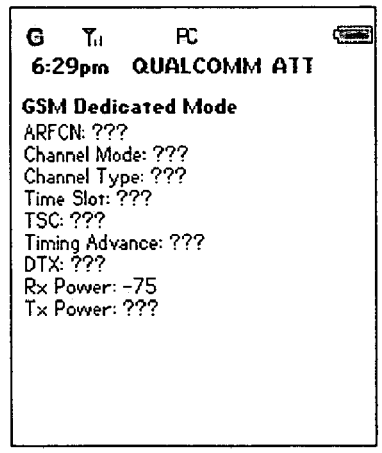
Figure 18A:
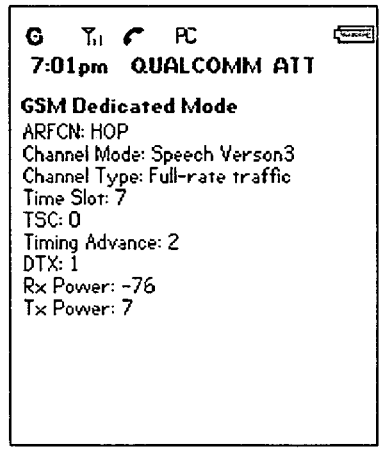

Referring to FIG. 18, from menu 1500 of FIG. 15, the user's selection of menu option 1518 instructs wireless device 112 to acquire data for one embodiment of a GSM Dedicated Mode test. A data view 1800 is generated by universal diagnostic monitor module 120 and presented in user interface 322 as illustrated in FIG. 18. In data view 1800, selected data categories, under which the data is retrieved, include ARFCN, Channel Mode, Channel Type, Time Slot, training sequence code (TSC), Timing Advance, a flag indicating use of discontinuous transmission (DTX), Rx Power, and Tx Power. In this snap-shot, almost all required data are not initially available, except for Rx Power. FIG. 18A is an updated view 1850 of data view 1800, wherein the previously unavailable data have been successfully obtained and presented via user interface 322.

Figure 19:
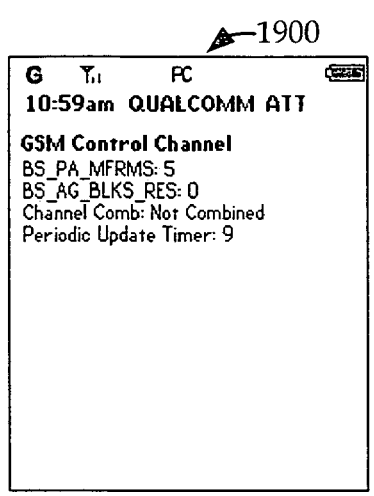

Referring to FIG. 19, from menu 1500 of FIG. 15, the user's selection of menu option 1519 instructs wireless device 112 to acquire data for one embodiment of a GSM Control Channel test. A data view 1900 is generated by universal diagnostic monitor module 120 and presented in user interface 322 as illustrated in FIG. 19. In data view 1900, the selected data categories, under which the data is retrieved, include an indicator for the number of multiframes (BS_PA_MFRMS), blocks reserved for access grant (BS_AG_BLKS_RES), common control channel (CCCH)/stand-alone dedicated control channel (SDCCH) channel combination (Channel Comb), and Periodic Update Timer. The retrieved data are arranged in the manner similar to the previously described data views.

Figure 20:
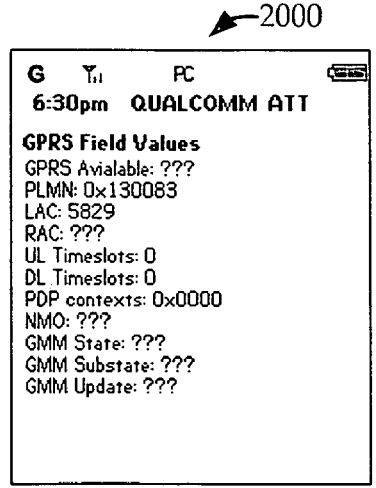
Figure 20A:
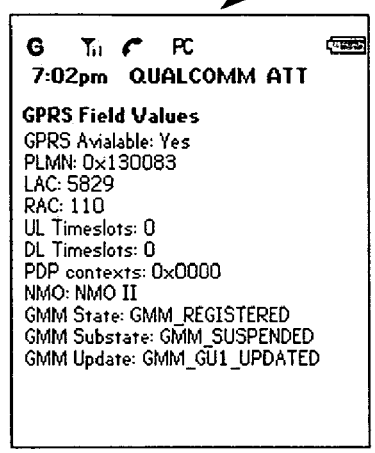

Referring to FIG. 20, from menu 1500 of FIG. 15, the user's selection of menu option 1520 instructs wireless device 112 to acquire data for one embodiment of a GSM Field Values test. A data view 2000 is generated by universal diagnostic monitor module 120 and presented in user interface 322 as illustrated in FIG. 20. In data view 2000, selected data categories, under which the data is retrieved, include GPRS Available, PLMN, LAC, RAC, UL Timeslots, DL Timeslots, packet data protocol (PDP) Contexts, network operating mode (NMO), GMM State, GMM Substate, and GMM Update. Some of the required data are not initially available. FIG. 20A is an updated view 2050 of data view 2000, wherein the previously unavailable data have been successfully obtained and presented via user interface 322.

Figure 21:
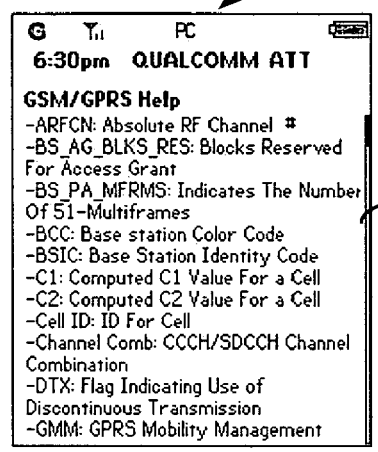

Referring to FIG. 21, from menu 1500 of FIG. 15, the user's selection of menu option 1521 brings up one embodiment of a GSM/GPRS Help view 2100 which, in this particular embodiment, provides information on and/or a brief explanation of the data categories used in the tests of menu options 1516-1520. Again, scrollbar 1135 may be utilized to view data outside of the given view. Other guidance and/or information are not excluded.

The above list of menu options 1516-1520 are provided only as an example and may be shortened or expanded depending on the given application. An alternative list of menu options for the GSM/GPRS protocol includes one or more of GSM Serving Cell (Idle), GSM Neighbor Cells (Idle), GSM Dedicated Mode, GSM Control Channel, GSM 3G Reject Database, GSM adaptive multi-rate (AMR) Information, GSM Channel Parameters, GSM enhanced general packet radio service (EGPRS) Uplink/Downlink Quality, GSM GPRS Air Interface Summary, GSM GPRS TX Timing, GSM Random Access Attempts, GPRS Field Values, GPRS logical link control (LLC) Statistics, and GPRS subnetwork dependent convergence protocol (SNDCP) Statistics. It should be noted, however, that additional menu options, predetermined tests, etc. may be included and/or developed to retrieve and display any GSM/GPRS diagnostic data, in any manner, that may be of interest to a user.

Figure 22:
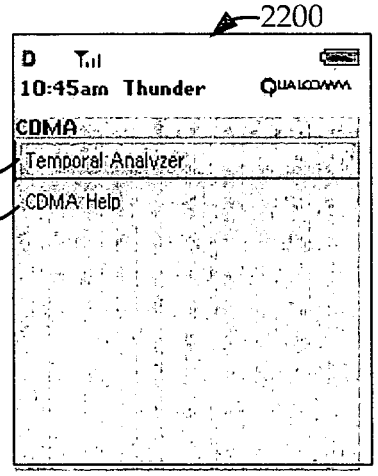

Referring to FIG. 22, the user's selection of menu option 522 (FIG. 5) brings up a lower level menu 2200 which corresponds to one embodiment of a CDMA protocol diagnostic menu. Menu 2200 corresponds to diagnostic menu 341 of FIG. 3, and, in this particular embodiment, includes only a single predefined set, namely, menu options 2223. A Help menu option 2224 is also provided in menu 2200 to assist the user with the correct understanding of menu option 2223. Again, the Refresh Time menu option (525 in FIG. 5) can be added to menu 2200.

Figure 23:
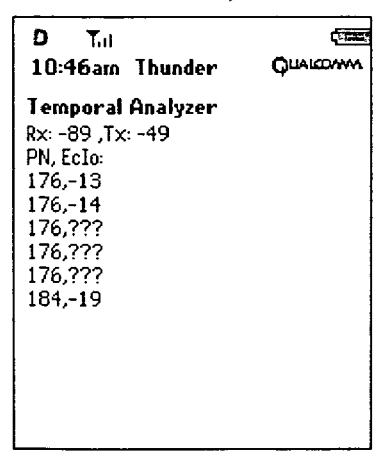

Referring to FIG. 23, from menu 2200 of FIG. 22, the user's selection of menu option 2223 instructs wireless device 112 to acquire data for one embodiment of a Temporal Analyzer test. A data view 2300 is generated by universal diagnostic monitor module 120 and presented in user interface 322 as illustrated in FIG. 23. In data view 2300, the selected data categories, under which the data is retrieved, include Rx, Tx, antenna finger's pilot assignment (PN), and EcIo. The retrieved data are arranged in the manner similar to the previously described data views.

Figure 24:
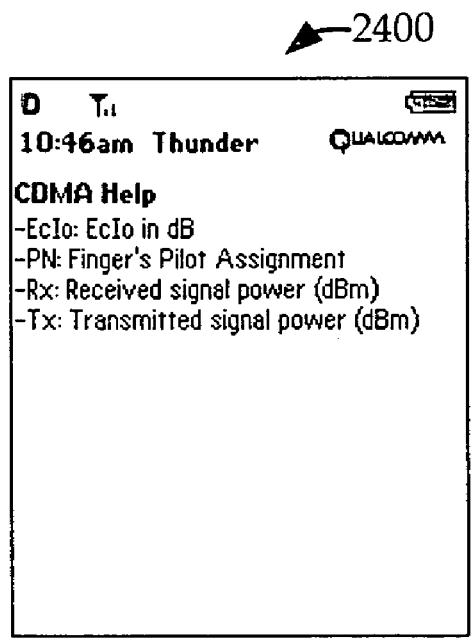
Figure 25:
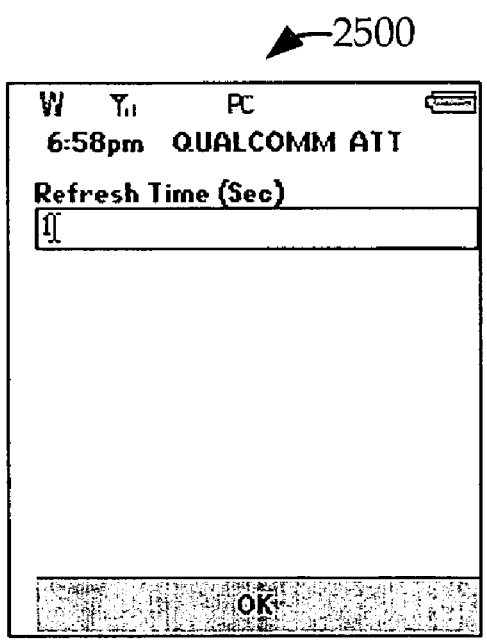

Referring to FIG. 24, from menu 2200 of FIG. 22, the user's selection of menu option 2224 brings up one embodiment of a CDMA Help view 2400 which, in this particular embodiment, provides information on and/or a brief explanation of the data categories used in the test of menu option 2223. Other guidance and/or information are not excluded.

Menu option 2223, Temporal Analyzer, is only an example of many menu options that can be added to menu 2200, which may be shortened or expanded depending on the given application. An exemplary list of diagnostic menus for the CDMA protocol includes one or more of Temporal Analyzer, Finger Placement, Signal Information, Static Status, Dynamic Status, Application Statistics, Full Test Data Service, Retrievable Parameters associated with a given standard such as IS-95A, radio link protocol (RLP) Statistics Logging, Service Configuration Information, and Simple Test Data Service. It should be noted, however, that additional menu options, predetermined tests, etc. may be included and/or developed to retrieve and display any CDMA diagnostic data, in any manner, that may be of interest to a user.

In one embodiment, the cellular telephone embodiment of universal diagnostic monitor module 120 may be based on the RAPTOR (Remotely Accessible Performance Tool and OptimizeR) framework developed by Qualcomm, Inc., of San Diego, Calif. In addition to BREW®, RAPTOR may be operable with other types of API 254. In the cellular telephone embodiment, retrieved data may be displayed via the user interface or display of the cellular telephone. The universal diagnostic monitor module may run in the background to continuously or periodically (based on the refresh rate which may be set common for all data categories or individually for each or each group of data categories) monitor diagnostic data. This helps the user to capture "difficult to get" data as described above, while allowing the user to use the cellular telephone to make or receive phone calls as usual. The cellular telephone embodiment is air-interface-independent and can run on all types of cellular telephone regardless of the wireless protocols being used. The cellular telephone of universal diagnostic monitor module 120 can be loaded dynamically to wireless device 112, e.g., over the air or through Embedded File System, or loaded statically with the wireless device's firmware.

As disclosed above with respect to FIG. 3, view 385 representing a snapshot of the data can be transmitted to another user via the route 347, 345 to wireless network 130. In one embodiment, the data retrieved from processing subsystems 84 may be stored in a data log 349, and this data log 349 may be forwarded across wireless network 130 to another computer device operable to generate the corresponding data view 385 based on log 349. For example, data log 349 may include a snapshot of the data representing a given view 385 based on the user's menu selections, alternatively, data log 349 may be all or some portion of a set of data continuously collected based on the user's menu selections. In yet another alternative embodiment, the retrieved data can be directly fed, as schematically shown at 343 in FIG. 3, to communications module 326 for further transmission to the other user, such as user manager 124 (FIG. 1) via wireless network 130. User interface configuration setting 383 may or may not be transmitted with the retrieved data. In one embodiment, only the retrieved data is transmitted, thereby reducing the transmission load and time.

Referring to FIG. 1, user manager 124 includes a communications module 126 communicable with communications module 326 via wireless network 130, user interface 122 and input mechanism 154. User manager 124 further includes universal diagnostic monitor module 121 which is similar to or different from universal diagnostic monitor module 120 of wireless device 112, depending on the given application. In the former case, user manager 124 may be another wireless device 112 which includes its own user interface generator 373 which will generate view 385 based on the retrieved data fed from the originating wireless device 112 and present view 385 on its own user interface 322. In the latter case, user manager 124 may be a stand alone server or service site having a server-side version of resident universal diagnostic monitor module 120, i.e., server-side universal diagnostic monitor module 121, which in addition to the generation and presentation of view 385, may have other specific features.

In particular, user manager 124 of FIG. 1 includes server-side universal diagnostic monitor module 121, which in turn includes user interface configurator 171 corresponding to user interface configurator 371 of universal diagnostic monitor module 120, and an analysis engine 159. Analysis engine 159 further includes user interface generator 173 corresponding to user interface generator 373 of universal diagnostic monitor module 120, and debug module 158. User interface generator 173 receives the data retrieved from subsystems 384 of wireless device 112 via communications module 126, and generates a view 185 of the retrieved data 381 which may or may not be identical to view 385 depending on the associated data orientations of server-side universal diagnostic monitor module 121. If the data orientations associated with the selected data categories are not transmitted with the retrieved data, user interface generator 173 will use its own, respective data orientations of server-side universal diagnostic monitor module 121. If the respective data orientations of universal diagnostic monitor module 120 and server-side universal diagnostic monitor module 121 are similar or identical, view 185 and view 385 will be similar or identical. However, if the respective data orientations of universal diagnostic monitor module 120 and server-side universal diagnostic monitor module 121 are not similar or identical, view 185 will be different from view 385.

In one embodiment, data orientations are configured to match the capacity of the user interface being used. In an embodiment, user manager 124 is a computer system that has user interface 122 with a greater displaying capacity (e.g., a bigger display of higher resolution and/or color depth and/or processing speed) than user interface 322 of wireless device 112 which is a cellular telephone. The data orientations of server-side universal diagnostic monitor module 121, therefore, is configured to generate a more complex view 185 than view 385 of wireless device 112. For example, while the data orientations of universal diagnostic monitor module 120 allow the retrieved data to be presented via user interface 322 using only alpha-numerical characters and simple formats such as the Comma Separated Values format as illustrated in FIGS. 5-25 In contrast, the same retrieved data can be presented via user interface 122 of user manager 124 using better visualization means, such as tables, graphs, charts, voice, video, animations, hyper links, etc., due to the data orientations of server-side universal diagnostic monitor module 121.

Server-side universal diagnostic monitor module 121 operates in the following manner. Debug module 158 receives the retrieved data from user interface generator 173 and automatically analyses the data, and sends commands or instructions via communications module 126 back to the originating wireless device 112. The commands or instructions instruct and provide guidance for wireless device 112 to attempt to improve its performance. Alternatively, user interface generator 173 causes user interface 122 to present, in addition to view 185, a debug menu 157. Based on the retrieved data presented in view 185, the operator at user manager 124 interacts with debug menu 157, via input mechanism 154, to troubleshoot or try to improve performance of wireless device 112. The operator's inputs are directed to debug module 158 and subsequently forwarded to wireless device 112 via wireless network 130.

In one embodiment of system 100 that includes user manager 124, some steps, such as steps 404, 406, 408410 and 411 of process 400 in FIG. 4 are performed at wireless device 112, whereas some other steps, such as steps 403, 405, 407, 412 and 414, are performed at user manager 124. For example, this embodiment may be employed in situations where the user of wireless device 112 uses universal diagnostic monitor module 120 to retrieve necessary data, but is unable to fully understand or lacks tools for analyzing the retrieved data. The user may then utilize universal diagnostic monitor module 120 to forward view 385 and/or retrieved data 389 to user manager 124 for presentation and/or analysis.

In a further embodiment, only step 408 and, optionally, step 414 of process 400 is/are performed at wireless device 112, whereas the remaining steps are performed at user manager 124. In this embodiment, process 400 is remotely initiated by the operator at user manager 124 who wants to retrieve data from subsystems 384 of wireless device 112. Subsequently, server-side universal diagnostic monitor module 121 causes diagnostic menu 141 to be presented via user interface 122, at 404, and the operator selects a predefined set or customizes a user-defined set of parameters, at 406, by selecting a menu option of diagnostic menu 141, in a manner similar to universal diagnostic monitor module 120 at wireless device 112. User interface configurator 171 then sends a retrieval request 179 via communications module 126, wireless network 130, and communications module 326 to wireless device 112. Like retrieval request 379, retrieval request 179 is forwarded in FIG. 3 (at 408 in FIG. 4) to API 254 for subsequent data retrieval at communications processing engine 382 and subsystems 384. Retrieved data 389 is returned, via paths 343, 345, communications module 326, wireless network 130 and communications module 126 to user interface generator 173. At 410, user interface generator 173 generates view 185 based on the retrieved data and user interface configuration setting 183 generated by user interface configurator 171 in a manner similar to universal diagnostic monitor module 120. At 412, view 185 is presented to the operator via user interface 122. The data update request 414 may be included in retrieval request 179 and handled at wireless device 112. However, it is not excluded that data update request 414 is handled by user manager 124 in which case retrieval request 179 is repeatedly sent to wireless device 112. Similar to the previously described embodiments, debug module 158 can be triggered, either automatically or by the operator, to send instructions and or commends to wireless device 112.

In another embodiment, universal diagnostic monitor module 120 at wireless device 112 may be provided with analysis engine 159 of server-side universal diagnostic monitor module 121, in which case the user of wireless device 112 can independently analyze the retrieved data without having to forward the data to user manager 124.

In yet another embodiment, server-side universal diagnostic monitor module 121 may poll wireless device 112 whether it has universal diagnostic monitor module 120 installed or not, and in the case of an negative answer, push a version of universal diagnostic monitor module 120 to wireless device 112. Such a version can be a full, resident version as described with respect to FIG. 3, or a light version intended to handle only the transfer of retrieval request 179 to API 254 if user manager 124 is going to handle the remaining steps of the process. The download of universal diagnostic monitor module 120, may be initiated by the user of wireless device 112.

The described embodiments have numerous advantages over the conventional diagnosing device and method using a tether. For example, the user or tester can directly use the wireless device, such as a cellular telephone, as a diagnostic monitor to retrieve necessary data without the need for a separate diagnosing device, e.g., a laptop, and a tether or cable. The wireless device, especially when it is a cellular telephone, is available anytime and anywhere as it is the device to be tested. The wireless device, especially when it is a cellular telephone, is easier to carry than a separate diagnosing device, e.g., a laptop. The wireless device, especially when it is a cellular telephone, is available for extensive periods of time since the battery life of a laptop being used as a separate diagnosing device is generally significantly shorter than the battery life of the cellular telephone. The retrieved data in the described embodiments is more accurate because the wireless device is not connected by a cable to a separate diagnosing device. In the conventional tethered diagnosing mode, cables attached to the wireless device, especially when it is a cellular telephone, may affect certain tests, such as RF testing because of the radiation. In addition, the described embodiments eliminate the need, and hence time and resources, for developing multiple diagnostic monitors for multiple types of wireless device, because the described embodiments are universal and platform free, and can operate on wireless devices of any type regardless of the air interfaces. Thus, a universal tool is made available by described embodiments for use across multiple types of wireless device, especially cellular telephones, and across multiple carriers.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. A wireless device, comprising:
    a communications processing engine having a plurality of diagnostic data relating to the operation of the wireless device on a wireless network in a first communication protocol;
    a computer platform having a universal diagnostic monitor module operable to retrieve selected ones of the plurality of diagnostic data from said communications processing engine, and operable to control generation of a view of the selected ones of the plurality of diagnostic data, wherein said universal diagnostic monitor module is further operable in a plurality of diagnostic modes each corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu, wherein said universal diagnostic monitor module is further operable to be selectively enabled in a selected one of the plurality of diagnostic modes corresponding to the first communication protocol;

a user interface operable to present said view;

wherein said universal diagnostic monitor module comprises a user interface configurator executable by the computer platform, said user interface configurator being operable to receive user inputs representative of at least one of the selected ones of the plurality of diagnostic data and said view, said user interface configurator being further operable, based on the user inputs, to control the retrieval of the selected ones of the plurality of diagnostic data and the generation of said view; and wherein the user interface configurator is executable by the computer platform independently of a protocol on which the wireless device and the wireless network operate.

2. The device of claim 1, wherein the universal diagnostic monitor module has a first operational protocol and the communications processing engine has a second operational protocol different from the first operational protocol;

said device further comprising an application programming interface (API) resident on the computer platform and operable to translate between the first operational protocol and the second operational protocol.

3. The device of claim 1, wherein said universal diagnostic monitor module further comprises a user interface generator operable to receive a user interface configuration setting generated by said user interface configurator in response to the user inputs and the selected ones of the plurality of diagnostic data from said communications processing engine, and further operable to initiate the generation of said view based on said user interface configuration setting and the selected ones of the plurality of diagnostic data.

4. The device of claim 1, wherein the user interface configurator includes configurable parameters which comprise at least one of a plurality of data categories under which the plurality of diagnostic data are grouped;

at least a relative data orientation within said view; and at least a data characteristic associable with one or more of the plurality of diagnostic data.

5. The device of claim 4, wherein the user interface configurator further includes at least one selectable predefined set of the parameters; said user interface configurator being operable, in response to a selection of said predefined set of the parameters, to retrieve the selected ones of the plurality of diagnostic data according at least to the data category or categories in said predefined set of the parameters.

6. The device of claim 5, the user interface configurator being operable to further present for selection, via said user interface, a menu option corresponding to said predefined set of the parameters.

7. The device of claim 6, wherein the user interface configurator includes multiple said predefined sets of the parameters; the user interface configurator being operable to further present for selection, via said user interface, multiple menu options corresponding to said multiple predefined sets of the parameters, respectively.

8. The device of claim 7, the user interface configurator being operable to further present, via said user interface, a user-defined menu option that for a user-defined set of the parameters.

9. The device of claim 7, the user interface configurator being operable to periodically refresh one or more of the selected ones of the plurality of diagnostic data, and to update said view accordingly.

10. The device of claim 9, the user interface configurator being operable to update said view only with respect to the data being refreshed.

11. The device of claim 9, the user interface configurator being operable to update said view by adding refreshed data to said view without removing previous data from said view.

12. The device of claim 11, wherein the refreshed data have a first form and the previous data have a second form, wherein the first form is different from the second form.

13. The device of claim 9, wherein said data characteristic associable with one or more of the plurality of diagnostic data includes a user-defined data refresh rate.

14. The device of claim 7, wherein the wireless device comprises a cellular telephone and wherein the wireless network comprises a cellular telephone network both operating on an code division multiple access (CDMA) protocol, wherein the multiple menu options are selected from the group consisting of Temporal Analyzer, Finger Placement, Signal Information, Static Status, Dynamic Status, Application Statistics, Full Test Data Service, IS-95A Retrievable Parameters, RLP3 Statistics Logging, Service Configuration Info, and Simple Test Data Service.

15. The device of claim 7, wherein the wireless device comprises a cellular telephone and wherein the wireless network comprises a cellular telephone network both operating on an universal mobile telephone system (UMTS) protocol, wherein the multiple menu options are selected from the group consisting of Call Reselect, Temporal Analyzer, RRC Status, NAS Information, Layer 1 Status, GSM Measurement, RACH Information, Block Error Rate, HSDPA Decoding Statistics, MAC Channel Mapping, MAC Channel Parameters, and Physical channels.

16. The device of claim 7, wherein the wireless device comprises a cellular telephone and wherein the wireless network comprises a cellular telephone network both operating on a GSM/GPRS protocol, wherein the multiple menu options are selected from the group consisting of GSM Serving Cell (Idle), GSM Neighbor Cells (Idle), GSM Dedicated Mode, GSM Control Channel, GSM 3G Reject Database, GSM AMR Information, GSM Channel Parameters, GSM EGPRS Uplink/Downlink Quality, GSM GPRS Air Interface Summary, GSM GPRS TX Timing, GSM Random Access Attempts, GPRS Field Values, GPRS LLC Statistics, and GPRS SNDCP Statistics.

17. The device of claim 1, the user interface configurator being executable by the computer platform to transmit said view via the wireless network to a user manager.

18. A wireless device, comprising:

a user interface;

a communications processing engine having a plurality of diagnostic data relating to the operation of the wireless device on a wireless network in a first communication protocol; and a computer platform having a universal diagnostic monitor module operable to retrieve selected ones of the plurality of diagnostic data from said communications processing engine, wherein said universal diagnostic monitor module is further operable in a plurality of diagnostic modes each corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu, wherein said universal diagnostic monitor module is further operable to be selectively enabled in a selected one of the plurality of diagnostic modes corresponding to the first communication protocol;

wherein said universal diagnostic monitor module comprises a user interface configurator executable by the computer platform to present the respective protocol-specific diagnostic menu via said user interface, said user interface configurator being operable to control the retrieval of the selected ones of the plurality of diagnostic data based on a received input responsive to the respective protocol-specific diagnostic menu;

wherein the user interface configurator includes configurable parameters which comprise at least one of
a plurality of data categories under which the plurality of diagnostic data are grouped;
at least a relative data orientation within said view;
at least a data characteristic associable with one or more of the plurality of diagnostic data;

wherein the respective protocol-specific diagnostic menu comprises a plurality of menu options each corresponding to a predefined set of the parameters; and wherein the respective protocol-specific diagnostic menu further comprises a user-defined menu option that allows for a user-defined set of the parameters.

19. The device of claim 18, said user interface configurator being further operable to transmit the selected ones of the plurality of diagnostic data via the wireless network to a user manager.

20. The device of claim 19, said user interface configurator being further operable to generate a user interface configuration setting in response to the received input, and to transmit the user interface configuration setting together with the selected ones of the plurality of diagnostic data via the wireless network to the user manager;

wherein said user interface configuration setting and the selected ones of the plurality of diagnostic data are sufficient for generation of a view of said selected ones of the plurality of diagnostic data at the user manager.

21. A user manager in a wireless network connecting a plurality of wireless devices each comprising a communications processing engine having a plurality of diagnostic data relating to the operation of the wireless device on the wireless network, said user manager comprising:

a communication module operable to connect said user manager with at least one of the wireless devices on the wireless network in a first communication protocol;
a user interface;
a server side monitor module operable to retrieve selected ones of the plurality of diagnostic data from the communications processing engine of said at least one wireless device, wherein said server side monitor module is further operable in a plurality of diagnostic modes each corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu, wherein said server side monitor module is further operable to be selectively enabled in a selected one of the plurality of diagnostic modes corresponding to the first communication protocol;

wherein said server side monitor module comprises a user interface configurator operable to present the respective protocol-specific diagnostic menu via said user interface, said user interface configurator being further operable to control the retrieval of the selected ones of the plurality of diagnostic data based on a received input responsive to the respective protocol-specific diagnostic menu;

wherein said analysis engine comprises a debug module operable to control optimization or troubleshooting of the operation of said at least one wireless device on the wireless network, based on the selected ones of the plurality of diagnostic data received from said at least one wireless device; and wherein said analysis engine is further operable to present a debug menu, via said user interface, to allow customized settings of said debug module.

22. The user manager of claim 21, wherein said server side monitor module further comprises an analysis engine operable to receive the selected ones of the plurality of diagnostic data from said at least one wireless device, and to generate and present a view of the selected ones of the plurality of diagnostic data via said user interface.

23. The user manager of claim 22, wherein said analysis engine comprises a user interface generator operable to receive a user interface configuration setting generated by said user interface configurator based on the operator inputs, and to generate said view based on said user interface configuration setting and the selected ones of the plurality of diagnostic data.

24. The user manager of claim 21, further comprising a client-side monitor module, said server side monitor module being operable to push said client-side monitor module to said at least one wireless device where said client-side monitor module is executed to retrieve the selected ones of the plurality of diagnostic data from the communications processing engine of said at least one wireless device;

said client-side monitor module operable in the plurality of diagnostic modes each corresponding to one of the plurality of communication protocols used by wireless devices to communicate on wireless networks, wherein said client-side monitor module is further operable to be selectively enabled in the selected one of the plurality of diagnostic modes so as to match the first communication protocol.

25. A process of monitoring the operation of a wireless device on a wireless network in a first communication protocol, comprising:

presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu;

receiving a first input operable to selectively enable a selected one of the plurality of diagnostic modes corresponding to the first communication protocol;

receiving a second input regarding at least one operational aspect of the wireless device;

retrieving, based on the received second input, selected ones of a plurality of diagnostic data which relate to the operation of the wireless device on the wireless network, the plurality of diagnostic data being available from a communications processing engine of the wireless device;

generating and presenting a view of the selected ones of the plurality of diagnostic data on the user interface;

presenting, on the user interface, a plurality of options each corresponding to one of a plurality of predefined sets of data categories under which the plurality of diagnostic data are grouped;

accepting a selection of at least one of the plurality of options;

periodically refreshing one or more of the selected ones of the plurality of diagnostic data; and updating the view with the refreshed data.

26. The process of claim 25, wherein retrieving further comprises executing the diagnostic monitor module on a computer platform of the wireless device to retrieve the selected ones of the plurality of diagnostic data from the communications processing engine, the diagnostic monitor module having a first operational protocol and being communicable with the communications processing engine, which has a second operational protocol different from the first operational protocol, via an application programming interface (API) operable to translate between the first operational protocol and the second operational protocol.

27. The process of claim 25, further comprising
associating at least a relative data orientation to each of the predefined sets; and
generating the view using the relative data orientation associated with the selected predefined set to arrange the selected ones of the plurality of diagnostic data within the view.

28. The process of claim 25, further comprising
presenting, on the user interface, a user-defined option; and
when the user-defined option is selected, allowing for a user-defined set of the data categories for which the selected ones of the plurality of diagnostic data are to be retrieved.

29. The process of claim 25, indicating a difference between the refreshed data and the ones of the plurality of diagnostic data that have not been refreshed.

30. The process of claim 25, further comprising
presenting, on the user interface, an option to customize a refresh rate to be used in refreshing one or more of the selected ones of the plurality of diagnostic data.

31. The process of claim 25, wherein the wireless device is a cellular telephone having a display;
the process being carried out completely at said cellular telephone; and
the view being presented on the display of the cellular telephone.

32. The process of claim 25, wherein the wireless device is a cellular telephone communicable with a user manager, having the user interface comprising a display, via the wireless network;
the retrieving being carried out at the cellular telephone;
the view being presented on the display of the server; and the receiving and generating being both carried out at either of said cellular telephone and the server.

33. The process of claim 25, wherein the wireless device is a cellular telephone, further comprising generating the plurality of diagnostic data comprising at least one of Random Access Channel (RACH) information and Temporal Analyzer information.

34. A computer program resident in a computer readable medium and comprising computer executable instructions that, when executed, direct a wireless device to perform the steps of:

presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes a first communication protocol used by the wireless device in communication with a wireless network, wherein each of the plurality of diagnostic modes comprises a protocol-specific diagnostic menu;

receiving a first input operable to selectively enable a selected one of the plurality of diagnostic modes corresponding to the first communication protocol;

receiving a second input regarding at least one operational aspect of the wireless device;

retrieving, based on the received second input, selected ones of a plurality of diagnostic data which relate to the operation of the wireless device on the wireless network, the plurality of diagnostic data being available from a communications processing engine of the wireless device;

generating and presenting a view of the selected ones of the plurality of diagnostic data on the user interface;

presenting, on the user interface, a plurality of options each corresponding to one of a plurality of predefined sets of data categories under which the plurality of diagnostic data are grouped;

accepting a selection of at least one of the plurality of options;

periodically refreshing one or more of the selected ones of the plurality of diagnostic data; and updating the view with the refreshed data.

35. A wireless communications device, comprising:
means for presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes a first communication protocol used by the wireless device in communication with a wireless network, wherein each of the plurality of diagnostic modes comprises a protocol-specific diagnostic menu;

means for receiving a first input operable to selectively enable a selected one of the plurality of diagnostic modes corresponding to the first communication protocol;

means for receiving a second input regarding at least one operational aspect of the wireless device;

means for retrieving, based on the received second input, selected ones of a plurality of diagnostic data which relate to the operation of the wireless device on the wireless network, the plurality of diagnostic data being available from a communications processing engine of the wireless device;

means for generating and presenting a view of the selected ones of the plurality of diagnostic data;

means for presenting, on the user interface, a plurality of options each corresponding to one of a plurality of predefined sets of data categories under which the plurality of diagnostic data are grouped;

means for accepting a selection of at least one of the plurality of options;

means for periodically refreshing one or more of the selected ones of the plurality of diagnostic data; and means for updating the view with the refreshed data.

36. A computer program resident in a computer readable medium and comprising computer executable instructions that, when executed, directs a wireless device to perform the steps of:

presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes a first communication protocol used by the wireless device in communication with a wireless network, wherein each of the plurality of diagnostic modes comprises a protocol-specific diagnostic menu;

receiving a first input operable to selectively enable a selected one of the plurality of diagnostic modes corresponding to the first communication protocol;

receiving a second input regarding at least one operational aspect of the wireless device;

retrieving, based on the received second input, selected ones of a plurality of diagnostic data which relate to the operation of the wireless device on the wireless network, the plurality of diagnostic data being available from a communications processing engine of the wireless device;

generating and presenting a view of the selected ones of the plurality of diagnostic data on the user interface;

presenting, on the user interface, a plurality of options each corresponding to one of a plurality of predefined sets of data categories under which the plurality of diagnostic data are grouped;

accepting a selection of at least one of the plurality of options;

periodically refreshing one or more of the selected ones of the plurality of diagnostic data;

updating the view with the refreshed data; and transmitting the selected ones of the plurality of diagnostic data via the wireless network to a user manager server.

37. A wireless communications device, comprising:

means for presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes a first communication protocol used by the wireless device in communication with a wireless network, wherein each of the plurality of diagnostic modes comprises a protocol-specific diagnostic menu;

means for receiving a first input operable to selectively enable a selected one of the plurality of diagnostic modes corresponding to the first communication protocol;

means for receiving a second input regarding at least one operational aspect of the wireless device;

means for retrieving, based on the second input, selected ones of a plurality of diagnostic data which relate to the operation of the wireless device on the wireless network, the plurality of diagnostic data being available from a communications processing engine of the wireless device;

means for generating and presenting a view of the selected ones of the plurality of diagnostic data on the user interface;

means for presenting, on the user interface, a plurality of options each corresponding to one of a plurality of predefined sets of data categories under which the plurality of diagnostic data are grouped;

means for accepting a selection of at least one of the plurality of options;

means for periodically refreshing one or more of the selected ones of the plurality of diagnostic data;

means for updating the view with the refreshed data; and means for transmitting the selected ones of the plurality of diagnostic data via the wireless network to a user manager server.

38. A computer program resident in a computer readable medium and comprising computer executable instructions that, when executed, direct a user manager server for a wireless network to perform the steps of:

connecting the user manager server with at least one among a plurality of wireless devices operating on the wireless network in a first communication protocol;

presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes the first communication protocol used by the wireless device in communication with a wireless network, wherein each of the plurality of diagnostic modes comprises a protocol-specific diagnostic menu;

receiving a first input operable to selectively enable a selected one of the plurality of diagnostic modes corresponding to the first communication protocol;

receiving a second input regarding at least one operational aspect of the wireless device;

based on the second input, retrieving selected ones of a plurality of diagnostic data which relate to the operation of the wireless device on the wireless network, the plurality of diagnostic data being available from a communications processing engine of the wireless device;

generating and presenting a view of the selected ones of the plurality of diagnostic data;

presenting, on the user interface, a plurality of options each corresponding to one of a plurality of predefined sets of data categories under which the plurality of diagnostic data are grouped;

accepting a selection of at least one of the plurality of options;

periodically refreshing one or more of the selected ones of the plurality of diagnostic data; and updating the view with the refreshed data.

39. A user manager server for a wireless network, comprising:
- means for connecting the user manager server with at least one among a plurality of wireless devices operating on the wireless network in a first communication protocol;
- means for presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes the first communication protocol used by the wireless device in communication with a wireless network, wherein each of the plurality of diagnostic modes comprises a protocol-specific diagnostic menu;
- means for receiving a first input operable to selectively enable a selected one of the plurality of diagnostic modes corresponding to the first communication protocol;
- means for receiving a second input regarding at least one operational aspect of the wireless device;
- means for retrieving, based on the second input, selected ones of a plurality of diagnostic data which relate to the operation of the wireless device on the wireless network, the plurality of diagnostic data being available from a communications processing engine of the wireless device;
- means for generating and presenting a view of the selected ones of the plurality of diagnostic data;
- means for presenting, on the user interface, a plurality of options each corresponding to one of a plurality of predefined sets of data categories under which the plurality of diagnostic data are grouped;
- means for accepting a selection of at least one of the plurality of options;
- means for periodically refreshing one or more of the selected ones of the plurality of diagnostic data; and
- means for updating the view with the refreshed data.

40. A wireless device, comprising:
- a communications processing engine having a plurality of diagnostic data relating to the operation of the wireless device on a wireless network in a first communication protocol;
- a computer platform having a universal diagnostic monitor module operable to retrieve selected ones of the plurality of diagnostic data from said communications processing engine, and operable to control generation of a view of the selected ones of the plurality of diagnostic data, wherein said universal diagnostic monitor module is further operable in a plurality of diagnostic modes each corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu, wherein said universal diagnostic monitor module is further operable to be selectively enabled in a selected one of the plurality of diagnostic modes corresponding to the first communication protocol;
- a user interface operable to present said view;
- wherein said universal diagnostic monitor module comprises a user interface configurator executable by the computer platform, said user interface configurator being operable to receive user inputs representative of at least one of the selected ones of the plurality of diagnostic data and said view, said user interface configurator being further operable, based on the user inputs, to control the retrieval of the selected ones of the plurality of diagnostic data and the generation of said view;
- wherein the user interface configurator includes configurable parameters which comprise at least one of
  - a plurality of data categories under which the plurality of diagnostic data are grouped;
  - at least a relative data orientation within said view; and
  - at least a data characteristic associable with one or more of the plurality of diagnostic data; and
- wherein the user interface configurator further includes at least one selectable predefined set of the parameters; said user interface configurator being operable, in response to a selection of said predefined set of the parameters, to retrieve the selected ones of the plurality of diagnostic data according at least to the data category or categories in said predefined set of the parameters.

41. A wireless device, comprising:
- a communications processing engine having a plurality of diagnostic data relating to the operation of the wireless device on a wireless network in a first communication protocol;
- a computer platform having a universal diagnostic monitor module operable to retrieve selected ones of the plurality of diagnostic data from said communications processing engine, and operable to control generation of a view of the selected ones of the plurality of diagnostic data, wherein said universal diagnostic monitor module is further operable in a plurality of diagnostic modes each corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu, wherein said universal diagnostic monitor module is further operable to be selectively enabled in a selected one of the plurality of diagnostic modes corresponding to the first communication protocol;
- a user interface operable to present said view;
- wherein said universal diagnostic monitor module comprises a user interface configurator executable by the computer platform, said user interface configurator being operable to receive user inputs representative of at least one of the selected ones of the plurality of diagnostic data and said view, said user interface configurator being further operable, based on the user inputs, to control the retrieval of the selected ones of the plurality of diagnostic data and the generation of said view;
- wherein the user interface configurator includes configurable parameters which comprise at least one of
  - a plurality of data categories under which the plurality of diagnostic data are grouped;
  - at least a relative data orientation within said view; and
  - at least a data characteristic associable with one or more of the plurality of diagnostic data;
- wherein the user interface configurator further includes at least one selectable predefined set of the parameters, said user interface configurator being operable, in response to a selection of said predefined set of the parameters, to retrieve the selected ones of the plurality of diagnostic data according at least to the data category or categories in said predefined set of the parameters; and wherein the user interface configurator is operable to further present for selection, via said user interface, a menu option corresponding to said predefined set of the parameters;

wherein the user interface configurator further includes multiple said predefined sets of the parameters, the user interface configurator being operable to further present for selection, via said user interface, multiple menu options corresponding to said multiple predefined sets of the parameters, respectively;

wherein the user interface configurator is operable to periodically refresh one or more of the selected ones of the plurality of diagnostic data, and to update said view accordingly;

wherein the user interface configurator is operable to update said view by adding refreshed data to said view without removing previous data from said view; and wherein the refreshed data have a first form and the previous data have a second form, wherein the first form is different from the second form.

42. A process of monitoring the operation of a wireless device on a wireless network in a first communication protocol, comprising:

presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu;

receiving a first input operable to selectively enable a selected one of the plurality of diagnostic modes corresponding to the first communication protocol;

receiving a second input regarding at least one operational aspect of the wireless device;

retrieving, based on the received second input, selected ones of a plurality of diagnostic data which relate to the operation of the wireless device on the wireless network, the plurality of diagnostic data being available from a communications processing engine of the wireless device;

generating and presenting a view of the selected ones of the plurality of diagnostic data on the user interface;

presenting, on the user interface, a plurality of options each corresponding to one of a plurality of predefined sets of data categories under which the plurality of diagnostic data are grouped;

accepting a selection of at least one of the plurality of options;

associating at least a relative data orientation to each of the predefined sets; and generating the view using the relative data orientation associated with the selected predefined set to arrange the selected ones of the plurality of diagnostic data within the view.

43. A process of monitoring the operation of a wireless device on a wireless network in a first communication protocol, comprising:

presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu;

receiving a first input operable to selectively enable a selected one of the plurality of diagnostic modes corresponding to the first communication protocol;

receiving a second input regarding at least one operational aspect of the wireless device;

retrieving, based on the received second input, selected ones of a plurality of diagnostic data which relate to the operation of the wireless device on the wireless network, the plurality of diagnostic data being available from a communications processing engine of the wireless device;

generating and presenting a view of the selected ones of the plurality of diagnostic data on the user interface;

presenting, on the user interface, a plurality of options each corresponding to one of a plurality of predefined sets of data categories under which the plurality of diagnostic data are grouped;

accepting a selection of at least one of the plurality of options;

presenting, on the user interface, a user-defined option; and when the user-defined option is selected, allowing for a user-defined set of the data categories for which the selected ones of the plurality of diagnostic data are to be retrieved.

44. A process of monitoring the operation of a wireless device on a wireless network in a first communication protocol, comprising:

presenting, on a user interface, a menu comprising a plurality of diagnostic modes of a diagnostic monitor module operable on the wireless device, each of the plurality of diagnostic modes corresponding to one of a plurality of communication protocols used by wireless devices to communicate on wireless networks, wherein the plurality of communication protocols includes the first communication protocol, wherein each of the plurality of diagnostic modes comprises a protocol-specific diagnostic menu;

receiving a first input operable to selectively enable a selected one of the plurality of diagnostic modes corresponding to the first communication protocol;

receiving a second input regarding at least one operational aspect of the wireless device;

retrieving, based on the received second input, selected ones of a plurality of diagnostic data which relate to the operation of the wireless device on the wireless network, the plurality of diagnostic data being available from a communications processing engine of the wireless device;

generating and presenting a view of the selected ones of the plurality of diagnostic data on the user interface;

presenting, on the user interface, a plurality of options each corresponding to one of a plurality of predefined sets of data categories under which the plurality of diagnostic data are grouped;

accepting a selection of at least one of the plurality of options; and presenting, on the user interface, an option to customize a refresh rate to be used in refreshing one or more of the selected ones of the plurality of diagnostic data.

* * * * *